(12) United States Patent
Liu et al.

(10) Patent No.: US 12,148,880 B1
(45) Date of Patent: Nov. 19, 2024

(54) METHODS FOR IMPROVING CRITICAL CURRENT DENSITY IN A SULFIDE-BASED ALL-SOLID-STATE LITHIUM-ION BATTERY

(71) Applicants: LG ENERGY SOLUTION, LTD., Seoul (KR); THE REGENTS OF THE UNIVERSITY OF CALIFORNIA, Oakland, CA (US)

(72) Inventors: Ping Liu, San Diego, CA (US); Ke Zhou, San Diego, CA (US); Mengchen Liu, San Diego, CA (US); Jeong Woo Oh, San Diego, CA (US); Min-Sang Song, Daejeon (KR)

(73) Assignees: LG ENERGY SOLUTION, LTD., Seoul (KR); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 18/650,734

(22) Filed: Apr. 30, 2024

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/008* (2013.01); *H01M 2300/0094* (2013.01)

(58) Field of Classification Search
None
See application file for complete search history.

(56) References Cited

U.S. PATENT DOCUMENTS

| | | |
|---|---|---|
| 2010/0330425 A1 | 12/2010 | Lopatin et al. |
| 2022/0416235 A1 | 12/2022 | Kim et al. |
| 2023/0127602 A1 | 4/2023 | Lee et al. |

FOREIGN PATENT DOCUMENTS

| | | |
|---|---|---|
| KR | 10-2012-0050983 A | 5/2012 |
| KR | 10-2022-0053825 A | 5/2022 |
| KR | 10-2023-0001509 A | 1/2023 |
| KR | 10-2023-0024284 A | 2/2023 |

*Primary Examiner* — Nathanael T Zemui
(74) *Attorney, Agent, or Firm* — Birch, Stewart, Kolasch & Birch, LLP

(57) ABSTRACT

Solid electrolyte compositions and solid-state batteries are disclosed, which comprise a solid electrolyte layer including a sulfide-containing solid-state electrolyte material and a compound of Chemical Formula 1. The sulfide-containing solid-state electrolyte material includes but is not limited to $Li_6PS_5Cl$ ("LPSC"), an LPS-based glass or glass ceramic of formula $xLi_2S \cdot yP_2S_5$, wherein $x+y=1$, or an argyrodite-based sulfide-based solid electrolyte or formula $Li_6PS_5X$, wherein X=Cl, Br, or I) or $Li_{6-y}PS_{5-y}Cl_{1+y}$, where y is <1. In some aspects, the compound of Chemical Formula 1 is sodium 3-mercapto-1-propanesulfonate (3M1P).

20 Claims, 16 Drawing Sheets

METHODS FOR IMPROVING CRITICAL CURRENT DENSITY IN A SULFIDE-BASED ALL-SOLID-STATE LITHIUM-ION BATTERY

FIELD OF TECHNOLOGY

The present disclosure relates to solid electrolyte compositions and a solid-state battery thereof, which have improved critical current density and reduced operating pressure. In some aspects, an additive, such as sodium 3-mercapto-1-propanesulfonate (3M1P) is used in a sulfide-based all-solid-sate electrolyte.

BACKGROUND

There continues to be an increase in electrified transportation, exemplified by the widespread adoption of electric vehicles (EVs) and the emergence of urban air mobility (UAM) vehicles. Simultaneously, there is a growing demand for stationary energy storage systems, notably in the residential and industrial sectors, powered by solar and wind generators. This shift is driven in part by the pressing need to mitigate the adverse environmental and climate impacts associated with traditional internal combustion engines and other non-renewable means of power generation. Thus, the development of battery technologies with high energy density, while also ensuring enhanced safety, has become an imperative.

Conventional liquid lithium-ion batteries were critical to the advancement of electrified transportation and energy storage systems, and have had a significant and positive impact on green energy and climate change mitigation efforts. While such conventional liquid lithium-ion batteries are superior to many other energy sources, liquid lithium-ion batteries also have certain limitations. For example, various safety mechanisms are critical for lithium-ion batteries to restrict voltage and internal pressures, but these safety features typically result in increased weight and performance limitations in certain instances. Moreover, lithium-ion batteries are susceptible to aging, leading to capacity loss and eventually failure after a number of years of use.

In the pursuit of achieving a net-zero emission society, recent efforts have focused on solid-state batteries, which offer higher energy density (e.g., >500 Wh kg$^{-1}$) and are safer than batteries with a liquid electrolyte system, such as conventional lithium-ion batteries. In a conventional solid-state battery, a solid electrolyte replaces a liquid electrolyte system, and thus reduces the risk of ignition or explosion, thereby increasing safety. However, the unstable interface between lithium metal and the electrolyte is a challenge. A potential disadvantage of solid electrolytes is the loss of Li ion transfer path due to cracks and voids that inevitably occur during charging and discharging processes, and which can eventually result in the failure of ion transfer. The formation of interfacial voids, delamination, dendrite, and heterogeneous solid-electrolyte interphase (SEI) in the cell at the modest stack pressure of 2 MPa are possible issues, which can lead to rapid battery failure. Accordingly, a significant issue for an all-solid-state lithium (Li) metal battery (also referred to as "ASSLMB") is the unstable interfacial challenges between a solid-state electrolyte (also referred to as "SSE") and Li metal, giving rise to Li dendrite formation and gap development, ultimately leading to short circuits and cell fail, among other issues.

Thus, there exists a need for a solid electrolyte for an all-solid-state battery, which has high ionic conductivity, thermal stability, and interfacial compatibility compared to existing solid electrolytes. Moreover, there remains a need for solid-state batteries that have improved critical current density and reduced operating pressure.

DISCLOSURE

Technical Problem

The present disclosure relates to methods for improving critical current density and reducing operating pressure in a battery (e.g., such as a sulfide all-solid-state lithium-ion battery), as well as solid-state batteries and solid electrolyte materials which comprise a compound of Chemical Formula 1 as an additive to a solid electrolyte material.

Technical Solution

The present disclosure relates to the use of a compound of Chemical Formula 1 as an additive to a solid electrolyte material, as well as a solid-state battery thereof. In certain aspects, the resulting solid electrolyte material can transfer lithium ions into a solid-state electrolyte, e.g., to provide percolated lithium ion conducting channels. Thus, in certain aspects, the lithium ion conducting channels facilitate contact between the solid-state electrolyte and the lithium metal.

In some aspects, an additive (e.g., including but not limited to sodium 3-mercapto-1-propanesulfonate (3M1P)), which has good lithium ion conductivity, can be used to conduct lithium ions together with the sulfide all-solid-sate electrolyte. For example, the modified sulfide all-solid-state electrolyte can have intimate contact with lithium metal, so that the sulfide all-solid-state battery with low pressure can cycle well, under conditions of low pressure.

Some aspects relate to modifying the surface of a sulfide all-solid-state electrolyte such as $Li_6PS_5Cl$ (LPSCl) with sodium 3-mercapto-1-propanesulfonate (3M1P) to achieve a composite sulfide electrolyte ("LPSCl@3M1P"), which is used to in-situ construct the interface molecular layer with Li metal. Electrochemical and surface analysis have established that the side reaction between Li and the electrolyte can be significantly mitigated, significantly improving the compatibility between them without affecting Li$^+$ diffusion. More importantly, the stable Li/electrolyte interface enables the deposition of hexagonally shaped Li crystals, terminated by its 110 surfaces. This faceted crystal growth leads to a dense, low-porosity Li layer with a smooth interface with the electrolyte layer, assuring the ultimate contact between electrolyte and Li metal. Consequently, in a Li|LPSCl@3M1P|NCM811 pellet cell and pouch cell, both can undergo stable cycling for 100 cycles with a high-capacity retention of 85%. Thus, surface molecular engineering can effectively suppress the parasitic reaction between Li and electrolyte, transforming the growth behavior of Li in ASSLMBs, and opening the door to long-life batteries in industrial production.

In some aspects, the critical current density increases from 0.6 mA to 4 mA, for example, which helps to increase the capacity of the battery. According to the present disclosure, there is a large improvement compared to existing technology.

The sulfide all-solid-state batteries according to the present disclosure can be charged and discharged under low pressure, e.g., manual battery installation instead of requiring a torque wrench.

Advantageous Effects

According to the present disclosure, the critical current density is increased, and the operating pressure is reduced using a compound of Chemical Formula 1 as an additive to a solid electrolyte material. Additionally, the present disclosure is further directed to providing a solid-state battery having good electrical and chemical properties including safety, heat resistant stability, energy density, life characteristics and Coulombic efficiency. It will be readily appreciated that these and other objects and advantages of the present disclosure may be realized by means or methods described in the appended claims and a combination thereof.

In an aspect, the critical current density ("CCD") is the highest current density before dendrites grow to produce a short circuit. For instance, the maximum endurable current density of lithium battery cycling without cell failure in SSLMB is generally defined as critical current density (CCD). Currently, it is generally accepted that the CCD can be measured using a symmetric Li/electrolytes/Li cell configuration at gradually increasing current densities. The current density at which a sharp potential drop occurs is considered equal to the CCD that is the current density at which Li dendrite propagation begins. According to the disclosure, a CCD of greater than about 4 mA cm$^{-2}$ is provided, e.g., the CCD can be greater than about 5 mA cm$^{-2}$, greater than about 6 mA cm$^{-2}$, greater than about 7 mA cm$^{-2}$, greater than about 8 mA cm$^{-2}$, greater than about 9 mA cm$^{-2}$, greater than about 10 mA cm$^{-2}$, greater than about 11 mA cm$^{-2}$, greater than about 12 mA cm$^{-2}$, greater than about 13 mA cm$^{-2}$, greater than about 14 mA cm$^{-2}$, or greater than about 15 mA cm$^{-2}$.

One aspect relates to a solid electrolyte composition comprising: a sulfide-containing solid electrolyte material, having a surface; and an organic coating, wherein the organic coating is formed on the surface of the sulfide-containing solid-state electrolyte material, and wherein the coating is formed from at least one compound of Chemical Formula 1 and the sulfide-containing solid-state electrolyte material:

A-R—W     Chemical Formula 1 wherein:
A is a SH or a leaving group;
R is a substituted or unsubstituted C3-C20 alkylene group; and
W is a sulfonate, a phosphonate, or a salt thereof.

In some aspects, in the solid electrolyte composition, the compound of Chemical Formula 1 is attached to the surface of the sulfide-containing solid-state electrolyte material by chemisorption, van der Waals interaction, or ionic interaction. Alternatively, the compound of Chemical Formula 1 reacts with the sulfide-containing solid-state electrolyte material to form a covalent bond.

In other aspects, in the compound of Chemical Formula 1, A is the SH group. In some aspects, in the compound of Chemical Formula 1, A is a leaving group selected from a triethoxysilyl or a trimethoxysilyl. In some aspects, in the compound of Chemical Formula 1, R is a C6-C16 alkyl group, and can be R is a C8-C12 alkyl group. In some aspects, the compound of Chemical Formula 1 has a total of 6 to 16 carbons. In some aspects, the compound of Chemical Formula 1 has a total of 8 to 12 carbons. In some aspects, in the compound of Chemical Formula 1, at least one of R is a substituted C3-C20 alkyl group, wherein there are one or more substituents selected from fluorine, chlorine, bromine, ester or ketone moieties.

In some aspects, the compound of Chemical Formula 1 is sodium 3-mercapto-1-propanesulfonate (3M1P):

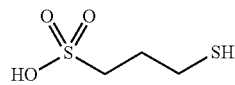

According to the disclosure, the sulfide-containing solid electrolyte material can be selected from the group consisting of an inorganic-based electrolyte material and an organic-based electrolyte material. In some aspects, the sulfide-containing solid electrolyte material is an inorganic electrolyte. For instance, the sulfide-containing solid electrolyte can comprise at least one selected from $Li_3P_7S_{11}$, $Li_{10}GeP_2S_{12}$, and $Na_3PS_4$ and/or $Li_6PS_5Cl$. Also, in some aspects, the sulfide-containing solid electrolyte comprises at least one selected from LPS-based glass or glass ceramic of formula $xLi_2S \cdot yP_2S_5$, wherein x+y=1. In some aspects, the sulfide-containing solid electrolyte comprises an argyrodite-based solid electrolyte of formula $Li_6PS_5X$, wherein X is Cl, Br, or I. In some aspects, the sulfide-containing solid electrolyte comprises an argyrodite-based solid electrolyte of formula $Li_{6-y}PS_{5-y}Cl_{1+y}$, where y is <1.

According to some aspects, a method is provided for making a solid electrolyte composition, comprising: providing a sulfide-containing solid electrolyte material; and reacting the solid electrolyte material with at least one compound of Chemical Formula 1 to form a coated sulfide-containing solid electrolyte material:

A-R—W     Chemical Formula 1 wherein:
A is a —SH group, a —SeH group, or a leaving group;
R is a substituted or unsubstituted C3-C20 alkylene group; and
W is a sulfonate, a phosphonate, or a salt thereof.

According to some aspects, a method is provided for making a solid electrolyte, comprising: providing a sulfide-containing solid electrolyte material; reacting the solid electrolyte material with at least one compound of Chemical Formula 1 to form a coated sulfide-containing solid electrolyte material; and using the coated sulfide-containing solid electrolyte material to form a solid electrolyte:

A-R—W     Chemical Formula 1 wherein:
A is a —SH group, a —SeH group, or a leaving group;
R is a substituted or unsubstituted C3-C20 alkylene group; and
W is a sulfonate, a phosphonate, or a salt thereof.

Some aspects relate to a solid electrolyte comprising the coated sulfide-containing solid electrolyte material.

Some aspects relate to an all-solid-state battery comprising a negative electrode, a positive electrode; and the solid electrolyte as described herein, wherein the solid electrolyte is interposed between the negative electrode and the positive electrode.

BRIEF DESCRIPTION OF THE DRAWINGS

The accompanying drawings illustrate aspects of the present disclosure, and together with the detailed disclosure, serve to provide a further understanding of the technical aspects of the present disclosure, and the present disclosure should not be construed as being limiting to the drawings. In the drawings, for clarity of description, the shape, size, scale or proportion of the elements may be exaggerated for emphasis.

FIG. 1A shows a schematic illustration of lithium deposition for an electrolyte comprising LPSCl, and FIG. 1B shows a schematic illustration of lithium deposition for an electrolyte comprising LPSCl and 3M1P. As discussed above, a significant issue for ASSLMBs is the unstable interfacial challenges between SSEs and Li metal, e.g., giving rise to Li dendrite formation and gap development, ultimately leading to short circuits and battery cell failure (FIG. 1A). For instance, delamination is caused by the deterioration of the interface and heterogenous $Li^+$ flux for the $Li_6PS_5Cl$ electrolyte without the surface treatment (FIG. 1A). Another problem is the urgent need for low stack pressure operation of ASSLMBs in industrial production. As described in certain aspects herein, surface molecular engineering is used to encapsulate a compound of sodium 3-mercapto-1-propanesulfonate (3M1P) onto a $Li_6PS_5Cl$ electrolyte using a simple ball-milling method. Interestingly, this process creates a compatible interface of electrolyte with Li metal and prompts the faceted Li crystal growth during plating at a modest stack pressure of 2 MPa (FIG. 1B), which helps inhibit interfacial voids formation and Li dendritic growth, ultimately allowing homogeneous $Li^+$ flux, and improves battery function. The LPSCl@3M1P electrolyte improves the compatibility of SSE and the Li metal anode, and helps make lithium metal batteries more practical.

FIG. 2A shows adsorption configurations, adsorption energy for Li and Li@3M1P. FIG. 2B shows the radial distribution function shows the distribution of the distances between the O/S atoms and the Li atoms during the timeframe of AIMD. FIG. 2C shows the probability distribution of in-plane (b) and out-of-plane (c) displacement of Li atoms in Li and Li@3M1P. O 2s (FIG. 2D) and S 2p XPS (FIG. 2E) plot for 3M1P, Li, and Li@3M1P|Li. FIG. 2F shows schematic diagram of in-situ construction of the surface molecular layer between LPSCl@3M1P electrolyte pellet and Li metal foil.

FIG. 3A shows the critical current density (CCD) CCD testing of symmetric Li|LPSCl|Li and Li|LPSCl@3M1P|Li cells stacked with pressure of 2 MPa at 25° C. FIG. 3B shows cycling performance of symmetric Li|LPSCl|Li and Li|LPSCl@3M1P|Li cells with various current rates at 2 MPa and 25° C. FIG. 3C shows the first and fifth cyclic voltammetry curves of Li|LPSCl|Li and Li|LPSCl@3M1P|Li at a sweeping rate of 0.5 mV s−1. FIG. 3D shows the S 2p XPS plot for the surface of Li|LPSCl|Li and Li|LPSCl@3M1P|Li after 100 cycles. FIG. 3E shows the Nyquist plot evolution of Li|LPSCl|Li and Li|LPSCl@3M1P|Li during stripping/plating in symmetric cells. FIG. 3F shows the TOF-SIMS secondary ion images of Li|LPSCl|Li and Li|LPSCl@3M1P|Li after 100 cycles with the 3D view images.

DETAILED DESCRIPTION

Figure 1A:
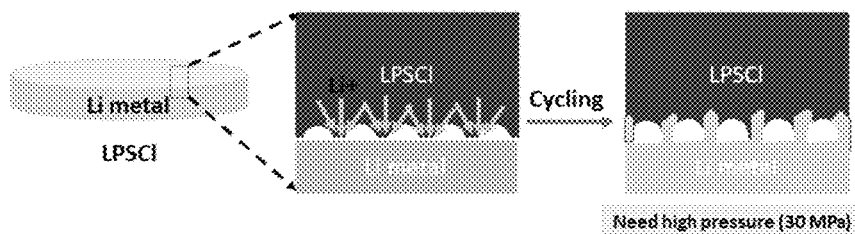
FIGS. 1A and 1B show a schematic diagram of the interface evolution between electrolyte and Li metal of LPSCl (FIG. 1A) and an electrolyte comprising LPSCl that has been surface treated with 3M1P ("LPSCl@3M1P") (FIG. 1B) electrolytes during cycling. Specifically.

Hereinafter, the present disclosure will be described in detail. It should be understood that the terms or words used in the specification and the appended claims should not be construed as limited to general and dictionary meanings, but rather interpreted based on the meanings and concepts corresponding to the technical aspects of the present disclosure on the basis of the principle that the inventor is allowed to define terms appropriately for the best explanation. Therefore, the aspects of the disclosure described herein and the elements shown in the drawings are just aspects of the present disclosure, but not intended to fully describe the technical aspects of the present disclosure, so it should be understood that other equivalents and modifications could have been made thereto at the time the application was filed. Unless defined otherwise, all the technical and scientific terms used herein have the same meanings as commonly known by a person skilled in the art. In the case that there is a plurality of definitions for the terms herein, the definitions provided herein will prevail.

Unless specified otherwise, all the percentages, portions and ratios in the present disclosure are on weight basis.

Unless indicated to the contrary, the numerical parameters set forth in the following specification and attached claims are approximations that may vary depending upon the desired properties sought to be obtained according to aspects of the disclosure. Whenever a numerical range with a lower limit and an upper limit is disclosed, any number and any included range falling within the range is specifically disclosed. Every range of values (of the form, "from about a to about b," or, equivalently, "from approximately a to b," or, equivalently, "from approximately a-b") disclosed herein is to be understood to set forth every number and range encompassed within the broader range of values.

While compositions and methods are described herein in terms of "comprising" various components or steps, the compositions and methods can also "consist essentially of" or "consist of" the various components and steps. The terms "comprise(s)" or "include(s)" when used in this specification, specifies the presence of stated elements, but does not preclude the presence or addition of one or more other elements, unless the context clearly indicates otherwise.

The terms "about" and "substantially" are used herein in the sense of at, or nearly at, when given the manufacturing and material tolerances inherent in the stated circumstances and are used to prevent the unscrupulous infringer from unfairly taking advantage of the present disclosure where exact or absolute figures are stated as an aid to understanding the present disclosure. The terms "about" and "approximate", when used along with a numerical variable, generally means the value of the variable and all the values of the variable within an experimental error (e.g., 95% confidence interval for the mean) or within a specified value±10% or within a broader range. Unless otherwise indicated, all numbers expressing quantities of ingredients, properties such as molecular weight, reaction conditions, and so forth used in the present specification and associated claims are to be understood may be modified by the term "about." "A and/or B" when used in this specification, specifies "either A or B or both." To achieve stable cycling behavior in ASSLMBs, the interface between Li metal and electrolyte should be thermodynamically stable or be passivated to be kinetically stable. For instance, the interface should prevent direct contact between Li and LPSCl to avoid side reactions. Secondly, it should electronically insulate while maintaining a strong Li+ affinity. Third, it should be chemically and electrochemically stable with Li and induce homogeneous nucleation. Considering these criteria, a preferred chemical compound is sodium 3-mercapto-1-propanesulfonate (3M1P) with "mercapto" (—SH) and sodium 3-hydroseleno-1-propanesulfonate "hydroseleno" (—SeH). The compound is not expected to displace S atoms in preexisting P—S bonds in the SSE, and is expected to attach to surface Li atoms via Li—S and Li—O bond formation. Importantly, this compound should conduct Li$^+$ because it is an ionic conductor.

Density functional theory (DFT) simulations were applied to gain insight into the interactions between the organic molecule of 3M1P and the Li interface by the adsorption energies. A 2×2×2 super cell with 120 Li atoms was constructed from the 110 interface Li body-centered unit cell. A 20 Å vacuum slab was created to put the organic molecule. The optimized lattice constants were obtained to be a=13.820 Å, b=14.658 Å and c=29.772 Å. According to the adsorption energy results, the organic compound can absorb onto the S atom for all modes. The configuration 3 (III) exhibits a much higher propensity to adsorb onto the Li surface (−2.11 eV) compared to others, indicating 3M1P is inclined to horizontal adsorption on Li surface (the S and Na atoms of 3M1P directly connected Li), facilitating the formation of thinner and stable surface molecular layer than vertical adsorption. Furthermore, the results of Ab initio molecular dynamics (AIMD) shows that many of the Li atoms around O and S atoms tend to be at the distance of about 2 Å, confirming the formation of new covalent interactions between them after the adsorption happened, indicting the formation of Li—O and Li—S bonds, which could support Li ion diffusion on the surface of Li compared to the pristine Li, in line with our expectations regarding the significance of the construction about a Li metal protective layer with two head-function groups.

When the probability distributions of the average displacements of lithium atoms from the supercells with and without the organic molecule are compared, the in-plane (left) displacement refers to the movements of the lithium atoms perpendicular to the crystallographic c-axis in the supercell, and the out-of-plane (right) displacement refers to the movements of the lithium atoms parallel to the crystallographic c-axis in the supercell (the direction of the vacuum slab).

The Li 1s spectrum (FIG. 1D) confirmed the new bonding in Li@3M1P assignment with the responsive oxide Li peaks at 54.33 eV. Meanwhile, the O 2s (FIG. 1F) can be observed where peaks at 531 and 535 eV can be assigned to S—O—Na and oxides contaminations in pristine Li system, while the peak at 528.5 eV appears, which can be assigned to S—O—Li. In addition, another new peak in the S 2s spectrum can be observed at 160.6 eV which should be related to the reaction between Li atoms and S head-function group. Thus, it can be concluded that the main chemical reaction of Li—O bond formation together with S—Li bond. The NMR data demonstrates the same result that Li metal can react with 3M1P forming some new local structure as shown in FIG. 2D. To confirm the compatibility of this organic compound with the LPSCl electrolyte, an obvious characteristic signal of Na was observed for the LPSCl@3M1P electrolyte. This organic substance does not change the chemical coordination of the LPSCl electrolyte, or affect the local structure of PS$_4^{2-}$. Meanwhile, the Li$^+$ conductivities of LPSCl and LPSCl@3M1P were measured as 1.78 and 1.75 mS cm$^{-1}$, respectively, at 25° C., by electrochemical impedance (AC) spectroscopy with two stainless steel blocking electrodes. Therefore, this organic compound is chemically stable with LPSCl and Li metal.

Figure 3A:
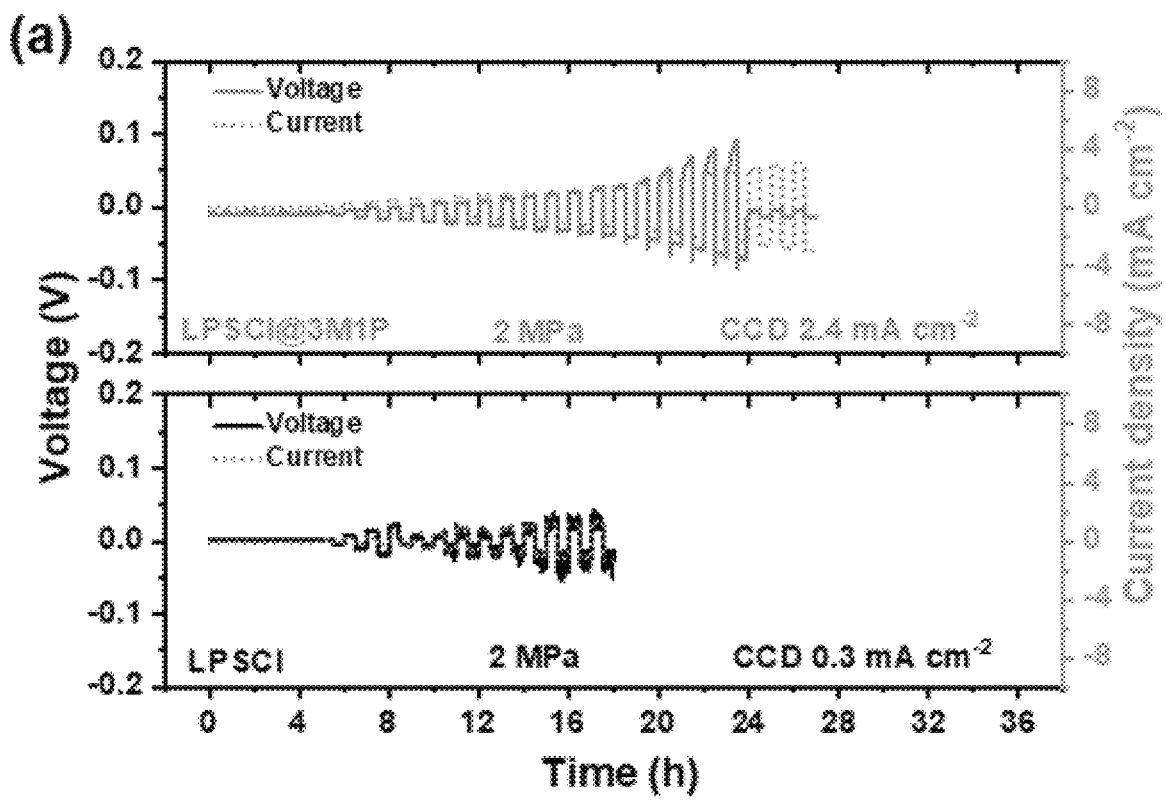
FIGS. 3A-F further show the interface characterization.
Figure 3B:
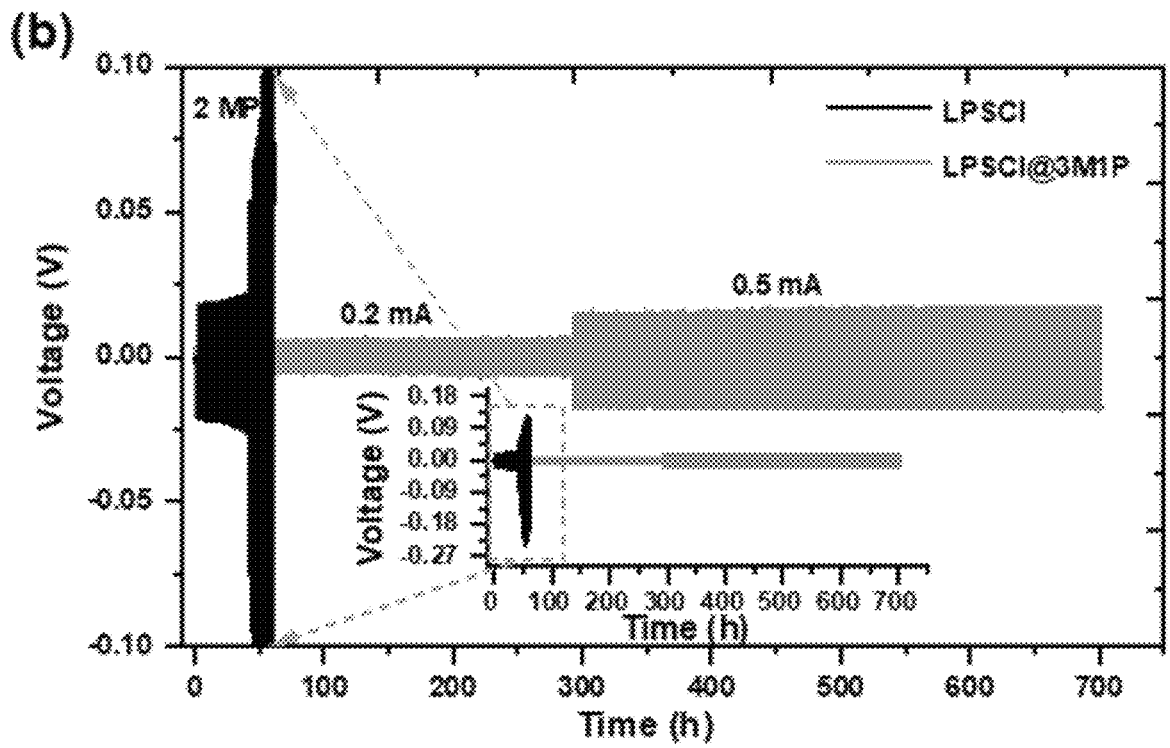

To study the electrochemical performance of the LPSCl@3M1P electrolyte, symmetric all-solid-state Li cells were fabricated using LPSCl and LPSCl@3M1P, with both electrolytes at a low pressure of 2 MPa. FIG. 3A shows the critical current density (CCD) curves of the Li|LPSCl|Li and Li|LPSCl@3M1P|Li symmetric cells at 25° C. The Li|LPSCl@3M1P|Li cell exhibits a CCD of 2.4 mA cm 2, which is higher than that of 0.3 mA cm$^{-2}$ in Li|LPSCl|Li cell. Moreover, the symmetric Li|LPSCl@3M1P|Li cell can cycle more than 500 h at a current density of 0.5 mA cm$^{-2}$ at 25° C. as shown in FIG. 3B, which is much longer than the 50 h for symmetric Li|LPSCl|Li cell. The overpotential of Li|LPSCl|Li severely increases to 0.15 V after 40 cycles which may arise from continuous electrolyte decomposition with Li metal and formation of Li dendrite leading to interfacial voids and delamination causing mechanical failures. While the overpotential of Li|LPSCl@3M1P|Li remains at 0.02 V. In the meantime, the Li|LPSCl@3M1P|Li cell can cycle approximately 300 h at 1 MPa. Two possible factors may explain the increased CCD number and cycling stability for LPSCl@3M1P electrolyte. First, LPSCl@3M1P is electrochemical stable with Li metal, in which smoother Li$^+$ transport paths are provided in the interface compared to LPSC. Second, the lithium dendrite on the surface of EES efficiently inhibits.

Figure 3C:
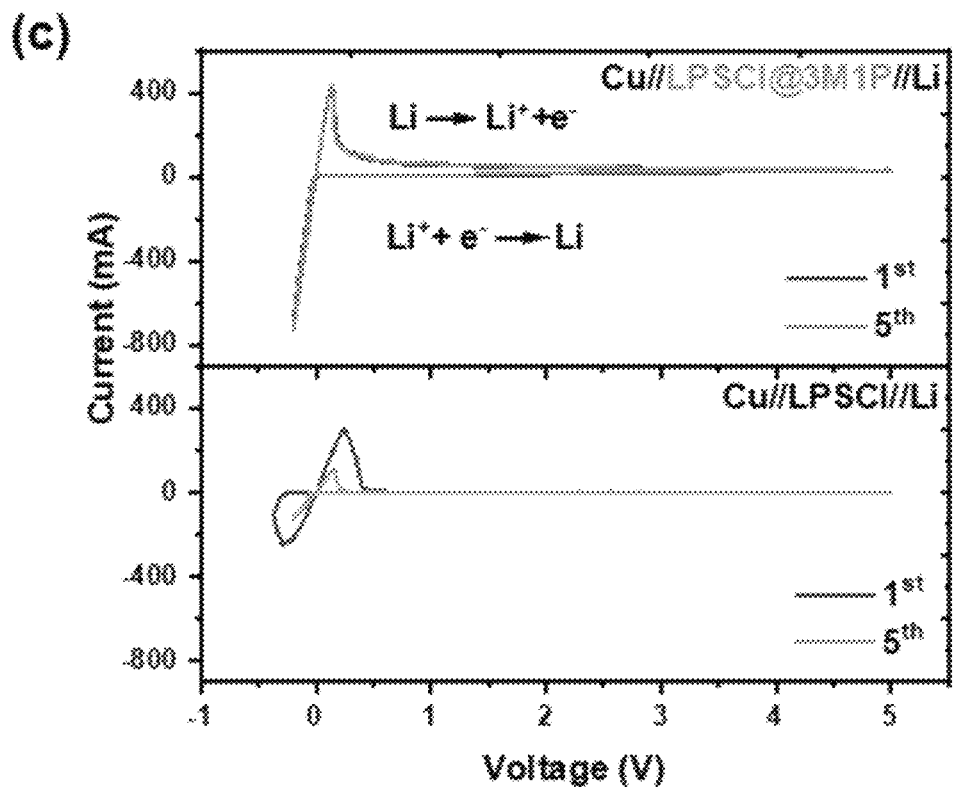

The electrochemical stability of LPSCl@3M1P electrolyte against lithium metal was investigated with cyclic voltammetry (CV) measurements. FIG. 3C demonstrates the redox peaks of Li around 0 V exist for both electrolytes. However, asymmetrical, and broad peaks can be observed for LPSCl due to the side reaction between the SSE and the Li metal after the 5th cycle. This result is like the previously reported argyrodite with Li metal counter electrode that the interface of them is thermodynamically unstable. While the redox peak of LPSCl@3M1P is very symmetrical, sharp and shows a highly stable CV curves against Li metal after the 5th cycle, indicating that the side reaction between Li and the electrolyte can be significantly mitigated resulting in the oxidation/reduction reaction is very reversible.

Figure 3D:
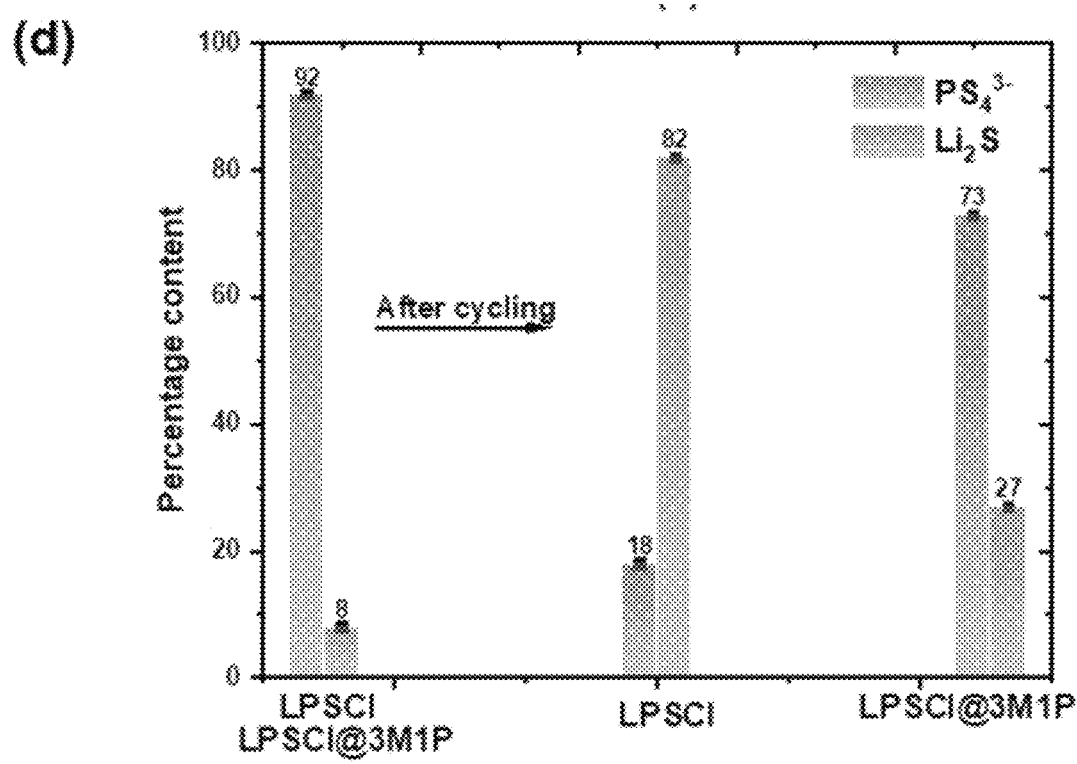

The XPS analysis was performed to further analyze the interfacial side reaction between both electrolytes and Li metal. We compared the S 2p XPS spectra of LPSCl and LPSCl@3M1P at a pristine condition and after the 100th cycles. At the pristine condition, the XPS spectra of two electrolytes shows same peak related with $PS_4^{3-}$ unit. The XPS spectra after the 100th cycle of two electrolytes exhibited different aspects; see FIG. 3D. The LPSCl spectra shows an increased area of Li2S peak produced by decomposition of electrolytes that possessed 82% of the whole spectra area. Note that the LPSCl@3M1P demonstrates that the decomposition of electrolytes is successfully restrained compared to LPSCl, which shows that the Li2S peak of by-product possessed 38% of whole spectra area. The result of the XPS analysis verifies that suppressing the decomposition of electrolytes leads to restraining the interfacial resistance between electrolytes and Li metal using LPSCl@3M1P electrolyte after long cycles.

Figure 3E:
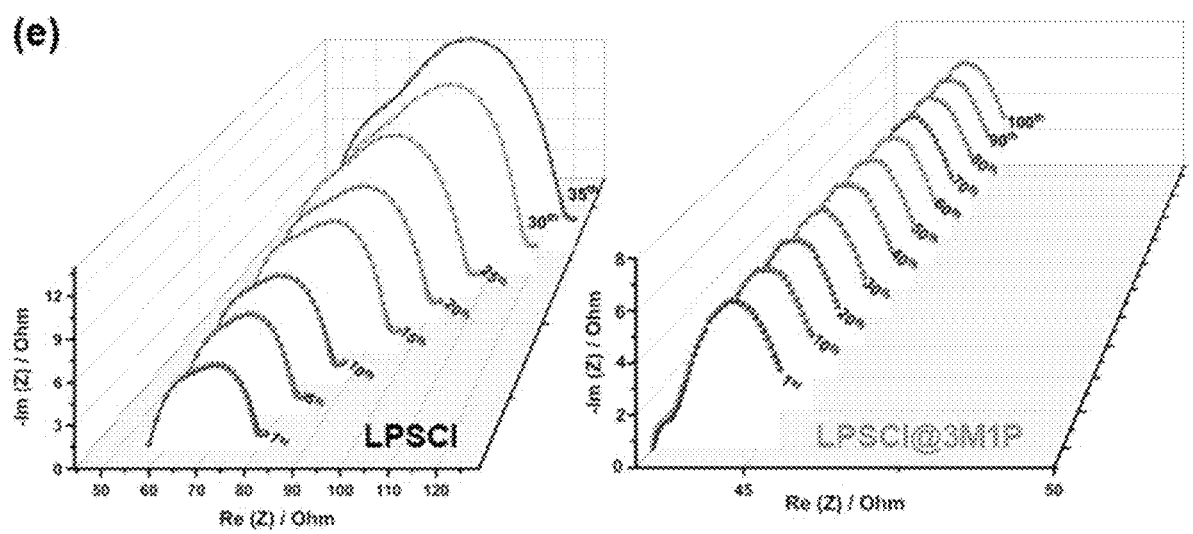

Meanwhile, the in-situ electrochemical impedance spectroscopy of both electrolytes in symmetric cells was examined. The impedance profile in the high-frequency (100 kHz) region indicates the resistance of solid electrolytes. The resistance at the middle-frequency (the peak top frequency of 500 Hz) indicates the interfacial resistance between the Li metal and the electrolytes. The result shows the first intersection with X axis and semicircles of the LPSCl electrolyte (FIG. 3E) keep increasing as the cycle increases. The resistance of LPSCl@3M1P shows no change and the small interfacial resistance than LPSCl. This implies that the interfacial resistance produced by the decomposition of the solid electrolytes during the charge/discharge cycle can be successfully suppressed by using LPSCl@3M1P. Therefore, the interface between the Li metal anode and the solid electrolytes becomes more electrochemically stable.

Figure 3F:
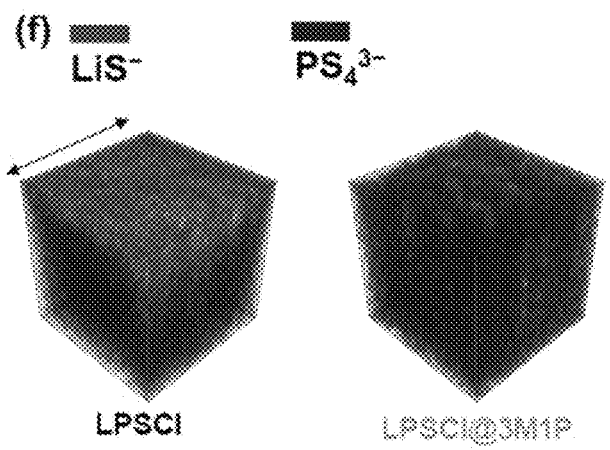

Next, the 3D tomography with a transverse resolution of 100 µm was measured via time-of-flight secondary-ion mass spectrometry (TOF-SIMS) to investigate the microstructure of the interface between electrolyte and Li metal, and the SEI. As illustrated in FIG. 3F, the ion fragment of Li2Sx was found to be distributed at the electrolyte surface, which indicated that it generated during the reaction between the lithium metal anode and electrolyte, consistent with the XPS result. On the other hand, another fragment of $PS_4^{3-}$ corresponding to the LPSCl electrolyte for two electrolytes further suggests the 3M1P organic compound effect of SEI formation. For LPSCl, the outer showed a lower content, which could be attributed to the easier reduction processes of anions on the surface of the lithium metal. In contrast, a higher content of $PS_4^{3-}$ was found to be located at the surface layer of the LPSCl@3M1P electrolyte.

As explained above, enhanced electrochemical stability against Li metal of LPSCl@3M1P electrolyte is verified by comprehensive experimental characterizations. Considering enhanced interfacial stability, LPSCl@3M1P electrolyte can suppress the interfacial resistance of composite cathode. By this, the solid electrolyte could be protected from dendrite penetration because Li would not grow at the solid electrolyte/interlayer interface.

Figure 4A:
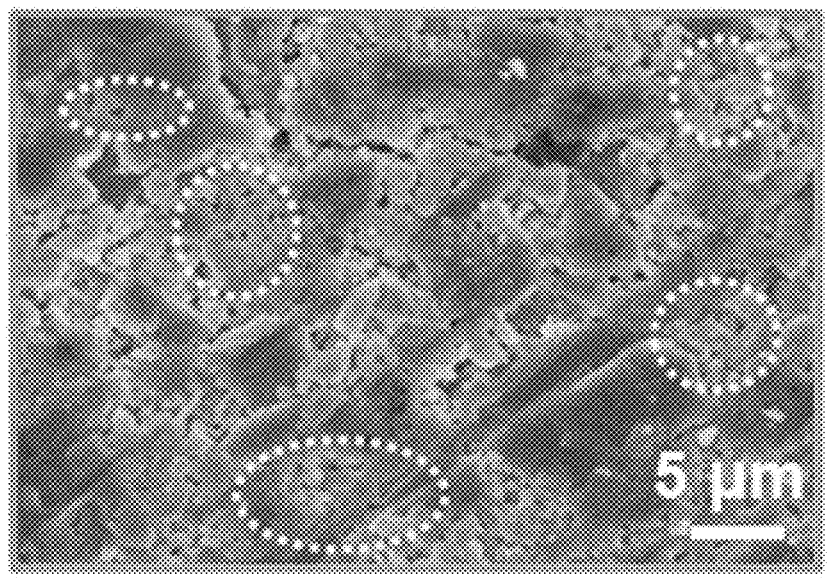
FIGS. 4A-H show details regarding the Li deposition morphology and interfacial kinetics, including: surface morphology of LPSCl (FIG. 4A) and LPSCl@3M1P (FIG. 4B) electrolytes in symmetrical cells after 40 cycles; FIB-SEM cross-sectional images of the stripped Li|LPSCl|Li (FIG. 4C) and Li|LPSCl@3M1P|Li (FIG. 4D) interfaces; FIB-SEM cross-sectional images of the plated Li|LPSCl|Li (FIG. 4E) and Li|LPSCl@3M1P|Li (FIG. 4F) interfaces. The symmetric cells were stripping/plating at current density of 0.2 mA cm-2 on a stack pressure of 2 MPa. The images of peeling off Li foil from Li|LPSCl|Li (FIG. 4G) and Li|LPSCl@3M1P|Li (FIG. 4H). The pressure evolution during the cycling of Li|LPSCl|Li and Li|LPSCl@3M1P|Li cells is shown in FIG. 4I.
Figure 4B:
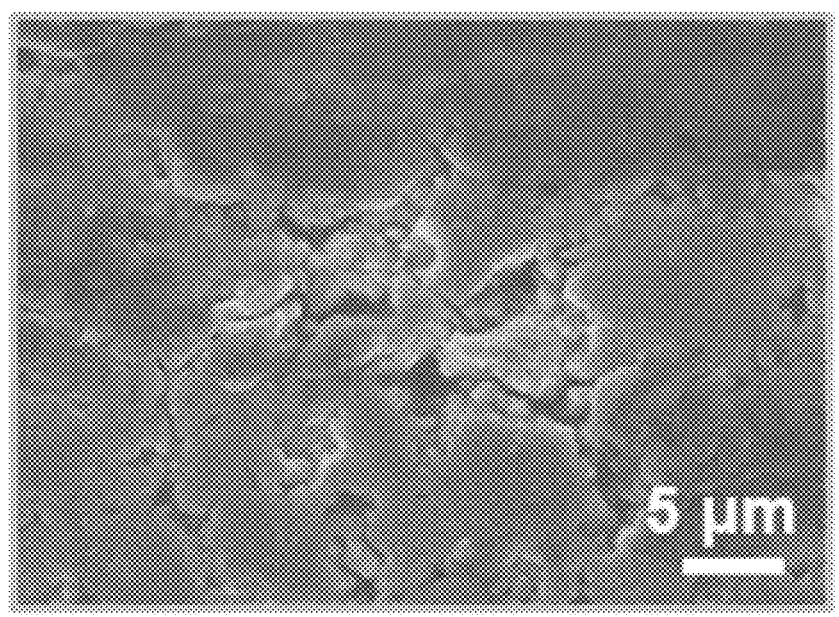

As shown in FIG. 4A, it was found that many pores were distributed at the interface after long cycles in the LPSCl electrolyte compared to the pristine condition. The LPSCl@3M1P interface appears smoother than that of LPSCl. The former may be caused by the decomposition between the electrolyte and Li metal. Moreover, Li plating/stripping after galvanostatic electrodeposition at current density of 0.2 mA cm$^{-2}$ in Li|SSEs|Li symmetric cells (FIGS. 4A and 4B) was carried out to investigate whether the modified electrolyte can suppress parasitic reaction and lithium dendrite growth to enable the low-pressure of 2 MPa operation.

Figure 4C:
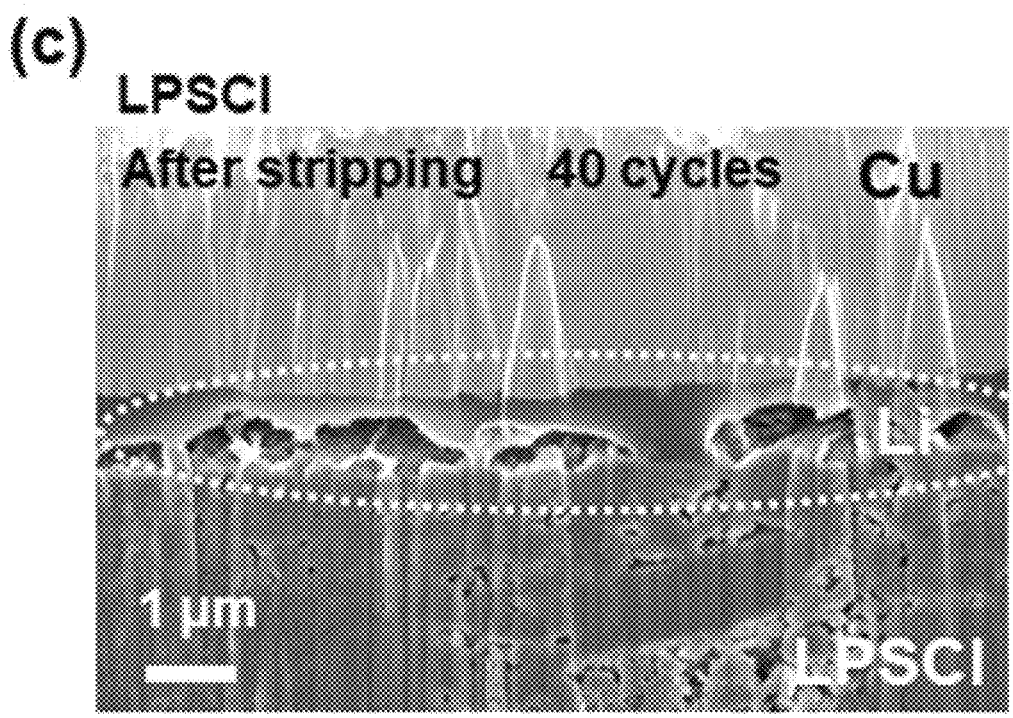
Figure 4D:
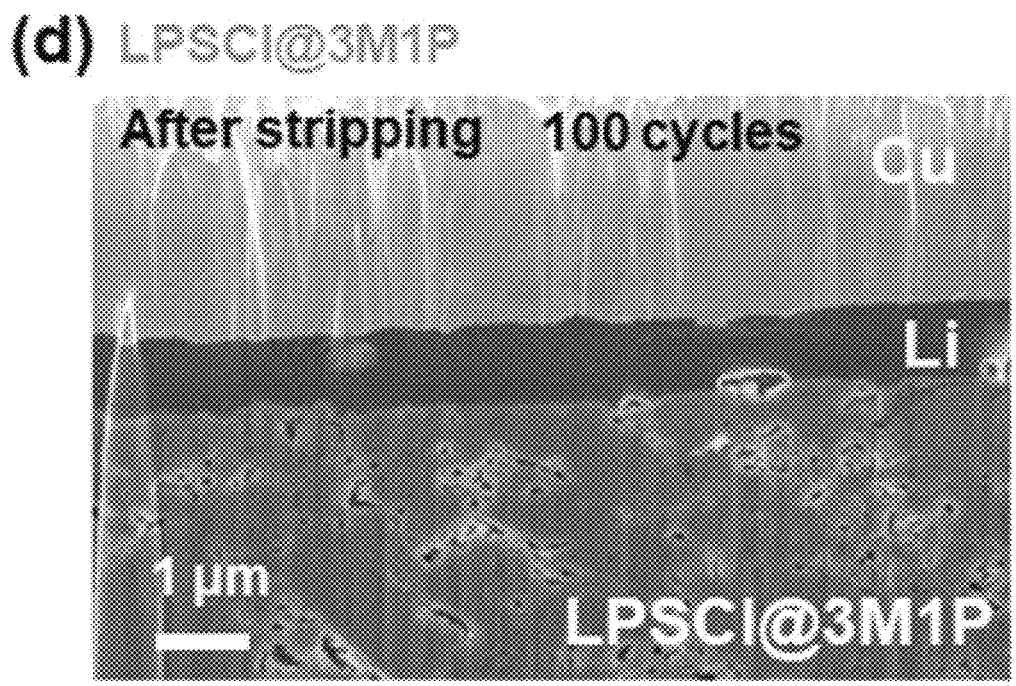
Figure 4E:
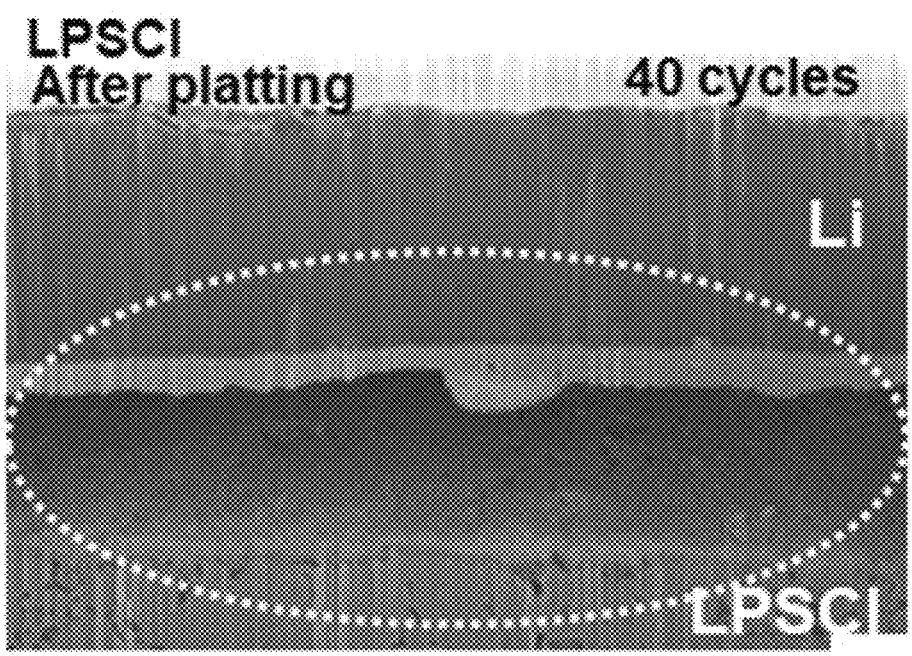

FIGS. 4C and 4D show the cross-sectional cryo-FIB SEM images of the stripped Li|LPSCl and Li|LPSCl@3M1P interfaces after Li deposited to a capacity of 3 mAh cm$^{-2}$ (e.g., a constant charge of 3 mAh cm$^{-2}$, which corresponds to approximately 14.5 mm of Li), respectively, indicating the Li electrode pulverization and voids formation on the Li surface in the region marked with a dotted yellow box, resulting in intact interfacial contacts loss and effect the local Li flux in LPSCl system. No voids were observed on the Li|LPSCl@3M1P electrode, which can be attributed to the homogeneous redistribution of Li flux in the Li plating/stripping process. The Li dendrites formation and severe SEI layer leads to consistent stress generation eventually cause a huge gap between Li metal and electrolyte (FIG. 4E), which is one of the biggest challenges of Li metal cycling, even under the low pressure.

Figure 4F:
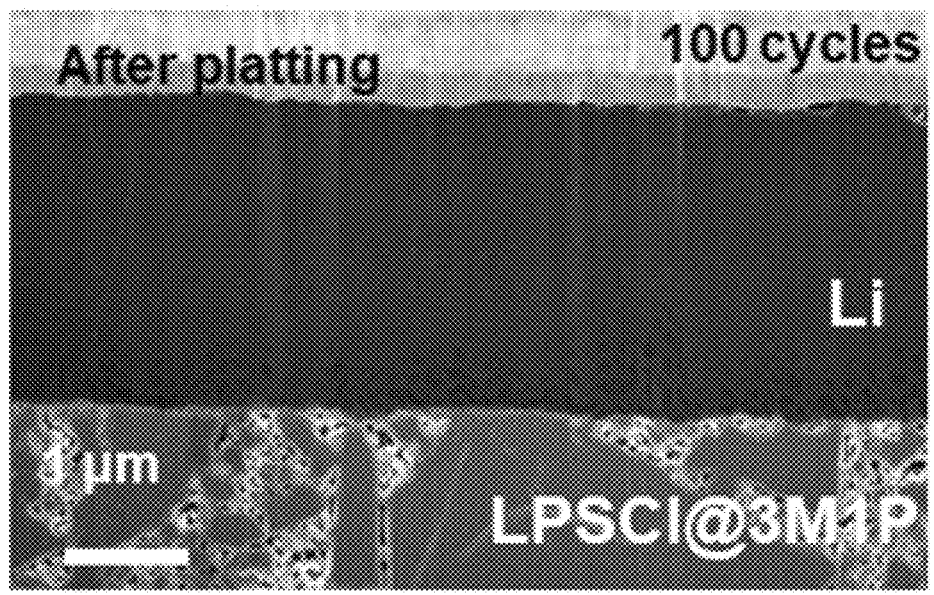

In stark contrast, Li|LPSCl@3M1P|Li demonstrated significantly enhanced intimate interface between Li metal and electrolyte guaranteeing uniform Li-ion fluxes, further inducing homogeneously Li deposited/dissolved on the Cu foil (FIG. 4F). An SEM image showed that the general morphology of the interface of LPSCl has a huge gap between electrolyte and Li metal. The interface of the Li|LPSCl@3M1P|Li electrode is more stable and smoother, without obvious dendrite and gap formation after cycling, which can be attributed to the homogeneous lithium plating/stripping process.

Figure 4G:
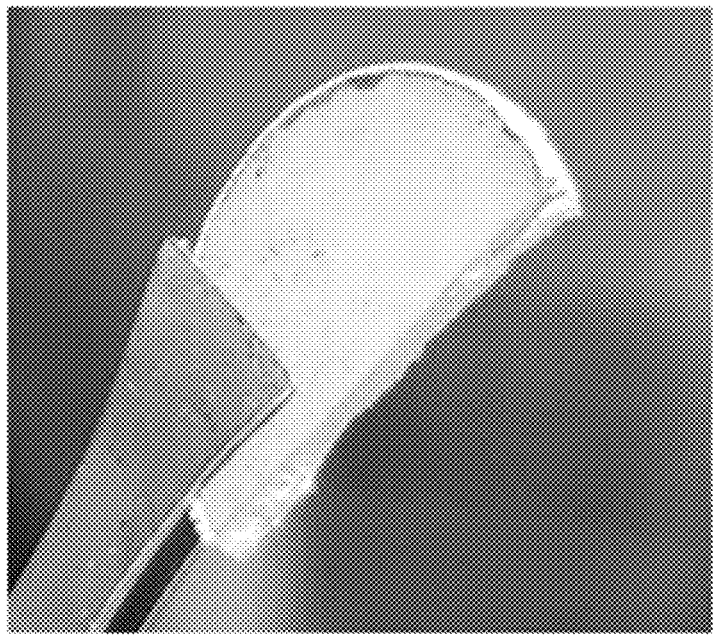
Figure 4H:
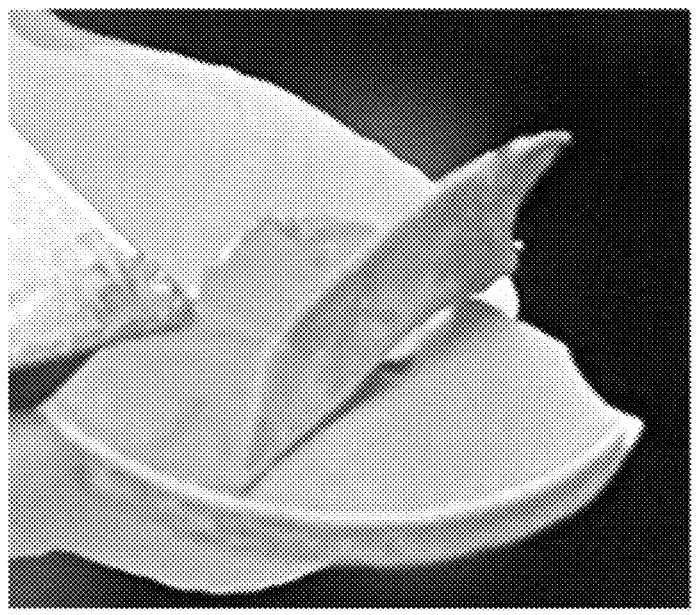
Figure 4I:
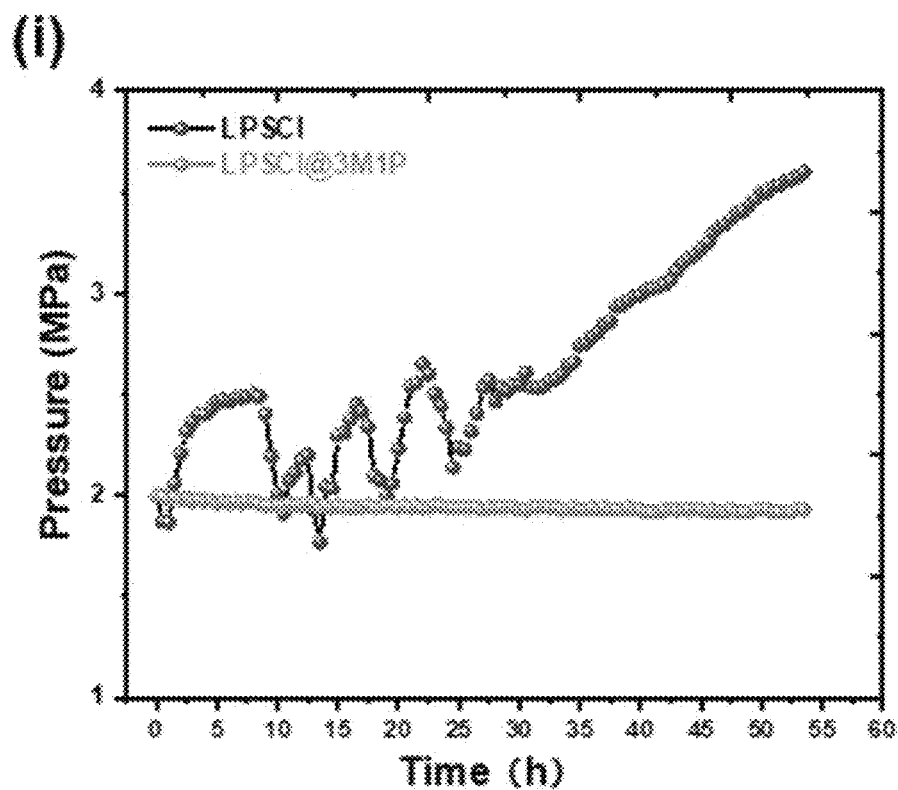

Thus, the LPSCl electrolyte, when combined with Li metal, undergoes a severe side reaction resulting in heterogenous Li morphology and Li$^+$ flux during cycling, ultimately leads to a short circuit and cell failure. A significant difference can be observed for the modified electrolyte of LPSCl@3M1P during plating and stripping. The surface and cross-section morphology shows almost no change, which is attributed to the stable electrochemically interface between electrolyte and Li metal, achieving homogeneous Li$^+$ flux and resisting the Li dendrite penetration. These characteristics will affect some physical properties of both electrolytes. Interestingly, it is found that the Li foil is difficult to peel off from the SSE in the LPSCl electrolyte (FIG. 4G). In contrast, it appears to be easily achievable for LPSCl@3M1P (FIG. 4H). Additionally, the stress evolution response of both electrolytes is entirely different. The (dis) charge time and associated cell's internal stress profiles are displayed in FIG. 4I, demonstrating the huge mechanical responses Li|LPSCl|Li during electrochemical process, resulting in an irreversible increase in pressure due to progressive contact loss and delamination.

An aspect of the present disclosure relates to a solid-state battery comprising a solid electrolyte material as an electrolyte. Specific examples of the solid-state battery include any type of primary battery, secondary battery, fuel cell, solar cell or capacitor such as a super capacitor. In particular, the secondary battery is, to be specific, a lithium-ion secondary battery. Aspects of the disclosure here may be implemented in a secondary battery with various form factors or battery formats, including for example in a pouch-type battery, a cylindrical battery, or a prismatic battery.

In an aspect of the disclosure, the solid-state battery according to the present disclosure comprises a negative electrode, a positive electrode and a solid electrolyte interposed between the negative electrode and the positive electrode. Hereinafter, the configuration and effect of the present disclosure will be described in detail.

In the present disclosure, the solid electrolyte composition comprises a sulfide-containing solid electrolyte material that has an organic coating, such as a compound of Chemical Formula 1, including but not limited to sodium 3-mercapto-1-propanesulfonate (3M1P).

For purposes of the present disclosure, any suitable sulfide-containing electrolyte material may be used. As used here, "sulfide-based electrolyte" refers to an electrolyte that includes inorganic materials containing S which conduct ions (e.g., Li+), and which are suitable for electrically insulating the positive and negative electrodes of an electrochemical cell. Exemplary sulfide-containing electrolytes are set forth in Shaojie Chen et al., "*Sulfide solid electrolytes for all-solid-state lithium batteries: Structure, conductivity, stability and application,*" *Energy Storage Materials*, Volume 14, Pages 58-74 (September 2018), which is hereby expressly incorporated by reference in its entirety.

For example, many sulfide-containing electrolyte materials are particularly attractive due to their superionic conductivities (as high as ~$10^{-2}$ S cm$^{-1}$) and deformability. In particular, $Li_3P_7S_{11}$, $Li_{10}GeP_2S_{12}$, and $Na_3PS_4$ and $Li_6PS_5Cl$ have been reported to exhibit high ionic conductivities, e.g.; some even close to those of liquid electrolytes. According to aspects of the disclosure, the sulfide solid electrolyte materials also provide a low Young's modulus, which is beneficial for producing favorable interface contacts with electrode materials by simple cold pressing at room temperature.

The sulfide-containing solid electrolyte, according to aspects of the disclosure, may contain sulfur (S) and have the ionic conductivity of metal belonging to Group I or II in the periodic table, e.g., Li$^+$. Additionally, in an aspect of the present disclosure, the selected solid electrolyte has the ionic conductivity of $1\times10^{-5}$ S/cm, or according to some aspects of the disclosure, $1\times10^{-3}$ S/cm or more.

Non-limiting examples of the sulfide-containing solid electrolyte may include Li—P—S-based glass, Li—P—S-based glass ceramic and argyrodite-based sulfide-containing solid electrolyte.

Non-limiting examples of the sulfide-containing solid electrolyte may include at least one of $xLi_2S$-$yP_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SnS$, $Li_2S$—$P_2S_5$—$Al_2S_3$, $Li_2S$—$GeS_2$ or $Li_2S$—$GeS_2$—$ZnS$, $Li_6PS5X$ (X=at least one of Cl, Br or I).

In an aspect of the present disclosure, the sulfide-containing solid electrolyte may comprise at least one selected from LPS-based glass or glass ceramic such as $xLi_2S$-$yP_2S_5$, or an argyrodite-based sulfide-containing solid electrolyte ($Li_6PS_5X$; X=Cl, Br, I).

The sulfide-containing solid electrolyte material is processed to form a coating on its surface. The sulfur or leaving group appears to react with the sulfur in the electrolyte material to interact non-covalently, or form a covalent bond, e.g., a sulfide bond or a disulfide bond.

The sulfur of the organic compound may be attached to the surface of the solid electrolyte material, (e.g., perhaps forming disulfide bond or a sulfide bond at one end), and the hydrophobic tail is arranged to surround the electrolyte material. This hydrophobic layer creates a barrier for water, and provides protection to the electrolyte material.

To form an organic coating, the sulfide-containing solid electrolyte material may be combined with at least one compound of Chemical Formula 1:

A-R-W           Chemical Formula 1 wherein:
A is a SH or a leaving group;
R is a substituted or unsubstituted C3-C20 alkylene group; and
W is a sulfonate, a phosphonate, or a salt thereof.

In certain aspects each R group is independently selected so that the compound of Chemical Formula 1 or Chemical Formula 2 will be a liquid. According to some aspects of the disclosure, the total number of carbons (including the chain and substituents) will be from 6 to 16 carbons, or according to some aspects of the disclosure, from 6 to 12 carbons, from 8 to 12 carbons, or from 10 to 12 carbons. The compound of Chemical Formula 1 may have a total of 6 carbons, 7 carbons, 8 carbons, 9 carbons, 10 carbons, 11 carbons, 12 carbons, 13 carbons, 14 carbons, 15 carbons, 16 carbons, 17 carbons, 18 carbons, 19 carbons, or 20 carbons. If the total number of carbons is too low, the compound may be too volatile for use. If the total number of carbons is too high, the compound may not be a liquid. Thus, according to some aspects of the disclosure, the number of total carbons, as well as the substituents and main chains can be adjusted as needed so that the compound is a liquid.

Each R group is independently a substituted or unsubstituted C3-C20 alkyl group, including, but not limited to a substituted or unsubstituted n-propyl, isopropyl, n-butyl, isobutyl, sec-butyl, tert-butyl, n-pentyl, tert-pentyl, isopentyl, n-hexyl, isohexyl, sec-hexyl, tert-hexyl, n-heptyl, isoheptyl, sec-heptyl, tert-heptyl, n-octyl, isooctyl, sec-octyl, tert-octyl, n-nonyl, isononyl, sec-nonyl, tert-nonyl, n-decyl, isodecyl, sec-decyl, tert-decyl, n-undecyl, isoundecyl, sec-undecyl, tert-undecyl, n-dodecyl, isododecyl, sec-dodecyl, tert-dodecyl, etc.

The R group may be substituted with one or more groups, including but not limited to ester, ketone, halogen (fluorine, chlorine, bromine), and/or one or more C3-C20 alkyl groups (e.g., a C3-C8 alkyl group). In some aspects, the R group may be substituted with an aryl (e.g., phenyl) or a heteroaryl group (e.g., a five or six membered ring, including but not limited to pyridine, pyrrole, furan, or thiophene).

The term "leaving group" may be understood as defined by the IUPAC, e.g., it may be an atom or group of atoms that detaches from the main or residual part of a substrate during a reaction or elementary step of a reaction. For instance, a leaving group may be a fragment that departs with a pair of electrons in heterolytic bond cleavage. In certain aspects, leaving groups may be anions or neutral species, departing from neutral or cationic substrates. Suitable leaving groups may be used, which are compatible with the solid electrolyte material.

In some aspects, the A group may be a "triethoxysilyl" moiety (e.g., derived from $HSi(OC_2H_5)_3$) or "trimethoxysilyl" (e.g., derived from $HSi(OCH_3)_3$).

The term "thiol" may be understood as an organosulfur compound of the form R—SH, where R represents an alkyl or other organic substituent.

The term "isocyanate" may be understood as a functional group with the formula R—N=C=O, where R may be an alkyl or aryl group.

The term "amine" may be understood as a compound or a functional group that contain a basic nitrogen atom with a lone pair. Amines are formally derivatives of ammonia (NH3), wherein one or more hydrogen atoms have been replaced by a substituent such as an alkyl or aryl group (e.g., alkylamines and arylamines). The substituent —$NH_2$ is called an amino group. In certain aspects, the amine may include primary amines, secondary amines, and/or tertiary amines. In certain aspects, amino groups can be further converted into a useful leaving group, e.g., by conversion to an ammonium salt, aryl(sulfonyl)amino groups, etc.

In some aspects, the sulfide-containing solid electrolyte material, and the compound of Chemical Formula 1 may be combined in a weight ratio of about 1:1 to 25:1, or according to some aspects, a weight ratio of about 1:1 to 10:1, a weight ratio of about 1:1 to 5:1, or a weight ratio of about 1:1.

Since sulfide-containing materials are sensitive to air and moisture, and might decompose to produce toxic gas such as $H_2S$, all the synthesis and test steps are, according to some aspects of the disclosure, performed in a glovebox or suitable apparatus (e.g., MBraun MB 200B, $H_2O<0.5$ ppm, $O_2<5.0$ ppm) filled with argon. Optionally, the reaction mixture of the sulfide-containing solid electrolyte material, and the compound of Chemical Formula 1 may further comprise a suitable solvent to aid in the dispersion.

Suitable reaction conditions may be used. In an aspect, the reaction temperature may be from room temperature to about 50° C. In some aspects, the reaction temperature may be from about 15° C. to about 40° C., from about 20° C. to about 40° C., from about 25° C. to about 40° C.

In an aspect, the reaction time may be about 30 minutes. In some aspects, the reaction time may be from about 1 hour to about 8 hours, and according to some aspects, from about 2 hours to about 7 hours or from about 3 hours to about 5 hours.

The progress of the reaction can be monitored using any suitable technique, including but not limited to a suitable technique, e.g., such as X-ray Photoelectron Spectroscopy or Nuclear Magnetic Resonance (NMR).

After the reaction is complete, the coated solid electrolyte material may be dried under any suitable conditions. In an aspect, the drying temperature will be from about 30° C. to about 100° C., from about 40° C. to about 100° C., from about 50° C. to about 100° C. According to some aspects of the disclosure, the drying is conducted under vacuum conditions. In an aspect, the drying time will be 30 minutes or longer. In another aspect, the drying time will be one hour or longer, and, according to some aspects, 2 hours or longer, 8 hours or longer, or 12 hours or longer.

In the present disclosure, the average particle size of the sulfide-containing solid electrolyte material may be adjusted to an appropriate range for the solid-state battery. In some aspects of the present disclosure, the solid electrolyte may have an average particle size of 0.1 µm to 50 µm.

In some aspects of the present disclosure, the solid electrolyte membrane may be manufactured by any suitable method.

For example, after the solid electrolyte material is coated, it may optionally be combined with other components if needed, and mixed to obtain a homogenous mixture. Subsequently, this mixture may be added to a predetermined organic solvent and dispersed to prepare a slurry, the slurry is applied to a release plate, and then dried to form a sheet shape. If necessary, the result of the sheet shape may be pressed to obtain a solid electrolyte membrane.

The thickness of the solid electrolyte layer formed by the lithium-tin-metal-sulfide-based compound is greatly different depending on the structure of the all-solid-state battery. However, for example, according to some aspects, it may be 0.1 µm or more and 1 mm or less, and according to additional aspects, 1 µm or more and 100 µm or less. The solid electrolyte, according to some aspects, has high lithium-ion conductivity, and the lithium ion conductivity at room temperature is, according to some aspects, $1\times10^{-4}$ S/cm or more, for example.

In an aspect, the solid electrolyte may further include a solid electrolyte commonly used in the all-solid-state battery. As an example, an inorganic solid electrolyte or an organic solid electrolyte may be used.

In the case of the inorganic solid electrolyte, a ceramic material, a crystalline material or an amorphous material may be used, and the inorganic solid electrolytes such as thio-LISICON ($Li_{3.25}Ge_{0.25}P_{0.75}S_4$), $Li_2S$—$SiS_2$, LiI—$Li_2S$—$SiS_2$, LiI—$Li_2S$—$P_2S_5$, LiI—$Li_2S$—$P_2O_5$, LiI—$Li_3PO_4$—$P_2S_5$, $Li_2$—$P_2S_5$, $Li_3PS_4$, $Li_7P_3S_{11}$, $Li_2O$—$B_2O_3$, $Li_2O$—$B_2O_3$—$P_2O_5$, $Li_2O$—$V_2O_5$—$SiO_2$, $Li_2O$—$B_2O_3$, $Li_3PO_4$, $Li_2O$—$Li_2WO_4$—$B_2O_3$, LiPON, LiBON, $Li_2O$—$SiO_2$, LiI, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}Nw$ (wherein w is w<1), and $Li_{3.6}Si_{0.6}P_{0.4}O_4$ can be used.

In addition, examples of the organic solid electrolyte include organic solid electrolytes prepared by mixing lithium salt to polymeric materials such as polyethylene derivatives, polyethylene oxide derivatives, polypropylene oxide derivatives, phosphate ester polymers, agitation lysine, polyester sulfide, polyvinyl alcohol, and polyvinylidene fluoride. In this case, these may be used alone or in combination of at least one.

The above-described coated sulfide-containing electrolyte material can be used for a solid electrolyte for an all-solid-state battery. The all-solid-state battery contains a positive electrode, a negative electrode, with the solid electrolyte interposed therebetween.

Meanwhile, the positive electrode and the negative electrode for the all-solid-state battery according to aspects of the present disclosure are not particularly limited and any suitable one known in the art can be used.

The all-solid-state battery proposed according to aspects of the present disclosure defines the constitution of the solid electrolyte as described above, and the other elements constituting the battery, that is, the positive electrode and the negative electrode, are not particularly limited in the present disclosure and follow the description below.

In an aspect, the negative electrode for the all-solid-state battery is a lithium metal alone, or negative electrode active material can be laminated on the negative electrode current collector.

The negative electrode current collector is not particularly limited as long as it is conductive without causing any chemical change in the all-solid-state battery, and for example, copper, stainless steel, aluminum, nickel, titanium, sintered carbon, copper or stainless steel whose surface is treated with carbon, nickel, titanium, silver or the like, or aluminum-cadmium alloy, etc. can be used. Additionally, as with the positive electrode current collector, the negative electrode current collector may include various forms such as a film, a sheet, a foil, a net, a porous body, a foam, and a nonwoven fabric having minute irregularities formed on their surfaces.

The negative electrode active material may be one or more of a lithium metal, a lithium alloy, a lithium metal composite oxide, a lithium-containing titanium composite oxide (LTO), and a combination thereof. In this case, the lithium alloy may be an alloy of lithium and at least one metal selected from Na, K, Rb, Cs, Fr, Be, Mg, Ca, Sr, Ba, Ra, Al and Sn. Also, the lithium metal composite oxide may be lithium and an oxide ($MeO_x$) of any one metal (Me) selected from the group consisting of Si, Su, Zn, Mg, Cd, Ce, Ni and Fe and for example, may be $LixFe_2O_3$ ($0≤x≤1$) or $LixWO_2$ ($0≤x≤1$).

In addition, the negative electrode active material may comprise metal composite oxides such as $Sn_xMe_{1-x}Me'_yO_z$ (Me: Mn, Fe, Pb, Ge; Me': Al, B, P, Si, elements of groups 1, 2 and 3 of the periodic table, halogen; 0<x≤1; 1≤y≤3; 1≤z≤8); oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$, and carbon-based negative electrode active materials such as crystalline carbon, amorphous carbon or carbon composite may be used alone or in combination of two or more.

In some aspects of the present disclosure, the positive electrode may comprise a positive electrode active material layer comprising a positive electrode active material, a positive electrode conductive material and a solid electrolyte. The positive electrode active material layer may further comprise a binder resin for the positive electrode if necessary. Additionally, the positive electrode comprises a current collector if necessary, and the positive electrode active material layer may be positioned on at least one surface of the current collector.

In some aspects of the present disclosure, the positive electrode active material may comprise at least one of lithium cobalt oxide ($LiCoO_2$), lithium nickel oxide ($LiNiO_2$), lithium manganese oxide of Formula $Li_{1+x}Mn_{2-x}O_4$ (x is 0 to 0.33, for example $LiMn_2O_4$), $LiMnO_3$, $LiMn_2O_3$, $LiMnO_2$, lithium copper oxide ($Li_2CuO_2$); vanadium oxide such as $LiV_3O_8$, $LiV_2O_4$, $V_2O_5$, $Cu_2V_2O_7$; Ni-site lithium nickel oxide represented by Formula $LiNi_{1-x}M_xO_2$ (M=Co, Mn, Al, Cu, Fe, Mg, B or Ga, 0<x<1), for example, $LiNi_{1-z}(Co,Mn,Al)_zO_2$ (0<z<1); lithium manganese composite oxide represented by Formula $LiMn_{2-x}M_xO_4$ (M=Co, Ni, Fe, Cr, Zn or Ta, x=0.01~1, for example, $LiMn_{1.5}Ni_{0.5}O_4$ or $Li_2Mn_3MO_8$ (M=Fe, Co, Ni, Cu or Zn); $LiMn_2O_4$ with partial substitution of alkali earth metal ion for Li in Formula; disulfide compounds; $Fe_2(MoO_4)_3$, or lithium iron phosphate ($LiFePO_4$). In some aspects of the present disclosure, the lithium iron phosphate may have all or at least part of the of the active material particle surface coated with a carbon material to improve conductivity.

According to aspects of the disclosure, the positive electrode active material may comprise at least one selected from Lithium Nickel Cobalt Manganese Oxide (for example, $Li(Ni,Co,Mn)O_2$, $LiNi_{1-z}(Co,Mn,Al)_zO_2(0<z<1)$), Lithium Iron Phosphate (for example, LiFePO4/C), Lithium Nickel Manganese Spinel (for example, $LiNi_{0.5}Mn_{1.5}O_4$), Lithium Nickel Cobalt Aluminum Oxide (for example, $Li(Ni,Co,Al)O_2$), Lithium Manganese Oxide (for example, $LiMn_2O_4$) and Lithium Cobalt Oxide (for example, $LiCoO_2$).

According to some aspects of the present disclosure, the positive electrode active material may comprise lithium transition metal composite oxide, and the transition metal may comprise at least one of Co, Mn Ni or Al.

In some aspects of the present disclosure, the lithium transition metal composite oxide may comprise at least one of compounds represented by the following formula 1.

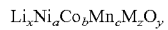  [Formula 1]

In the above Formula 1, 0.5≤x≤1.5, 0<a≤1, 0≤b<1, 0≤c<1, 0≤z<1, 1.5<y<5, a+b+c+z is 1 or less, and M may comprise at least one selected from Al, Cu, Fe, Mg and B.

In some aspects of the present disclosure, the positive electrode active material includes a positive electrode active material having high Ni content of a of 0.5 or more, and its specific example may comprise $LiNi_{0.8}Co_{0.1}Mn_{0.1}O_2$.

In some aspects of the present disclosure, the positive electrode conductive material may be, for example, at least one conductive material selected from the group consisting of graphite, carbon black, carbon fibers or metal fibers, metal powder, conductive whiskers, conductive metal oxide, activated carbon or polyphenylene derivatives. More specifically, the positive electrode conductive material may be at least one conductive material selected from the group consisting of natural graphite, artificial graphite, super-p, acetylene black, ketjen black, channel black, furnace black, lamp black, thermal black, denka black, aluminum powder, nickel powder, zinc oxide, potassium titanate and titanium oxide.

The current collector is not limited to a particular type and may include those having high conductivity without causing a chemical change in the corresponding battery, for example, stainless steel, copper, aluminum, nickel, titanium, sintered carbon, or aluminum or stainless steel treated with carbon, nickel, titanium and silver on the surface.

The positive electrode binder resin may include polymer for electrode commonly used in the technical field. Non-limiting examples of the binder resin may include, but are not limited to, polyvinylidene difluoride, polyvinylidene fluoride-co-hexafluoropropylene, polyvinylidene fluoride-co-trichloroethylene, polymethylmethacrylate, polyethylhexyl acrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methyl cellulose.

In some aspects of the present disclosure, the solid electrolyte included in the positive electrode may comprise at least one selected from a polymer-based solid electrolyte, an oxide-based solid electrolyte and a sulfide-containing solid electrolyte. In some aspects of the present disclosure, the positive electrode active material may comprise the sulfide-containing solid electrolyte described in the solid electrolyte membrane.

In some aspects of the present disclosure, the positive electrode active material is included in the positive electrode in an amount of 50 wt % or more based on 100 wt % of the positive electrode active material layer. Additionally, the solid electrolyte is, according to aspects of the disclosure, included in the positive electrode in an amount of 10 wt % to 40 wt % based on 100 wt % of the positive electrode active material layer.

Meanwhile, in some aspects of the present disclosure, the positive electrode may have a loading amount (per electrode area) of 5 $mAh/cm^2$ or more, 6 $mAh/cm^2$ or more, or 10 $mAh/cm^2$ or more. In the battery according to the present disclosure, when the high loading positive electrode is applied, it is possible to operate the battery on the electrochemically stable level.

Meanwhile, in some aspects of the present disclosure, the positive electrode active material layer may be obtained by adding the positive electrode active material, the conductive material, the binder resin and the solid electrolyte to an appropriate solvent to prepare a slurry and casting the slurry, or may be obtained by a manufacturing method according to a dry mixing process without a solvent. Meanwhile, in some aspects of the present disclosure, it is possible to achieve the uniform mixing of the positive electrode materials in the positive electrode, thereby obtaining a high loading positive electrode, and in this aspect, the positive electrode is obtained by the dry mixing process using no solvent.

The method of manufacturing the positive electrode active material layer by the dry mixing method may be described, for example, as below. First, the positive electrode materials comprising the positive electrode active material, the conductive material and the binder resin are put into a mixing device and mixed by a mechanical method to obtain a mixture. The mixing device includes any type of device that can form a comparatively homogeneous mixture phase such as a well-known mixer agitator, and is not limited to a particular type of device. Meanwhile, in some aspects of the present disclosure, to improve the dispersion of solids and induce the fibrous form of the binder resin in the mixing process, a temperature rising process may be included. In the temperature rising process, the temperature may be appropriately controlled in the range of about 30° C. to 100° C.

Subsequently, the positive electrode active material layer may be formed by extracting the mixture into the shape of an electrode (a wide film shape) using an extruder, and adjusting the thickness through a pressing process. The positive electrode active material layer may be applied to the electrode with no current collector, or if necessary, the current collector may be attached to the obtained positive electrode active material layer to prepare the positive electrode including the current collector.

Figure 1B:
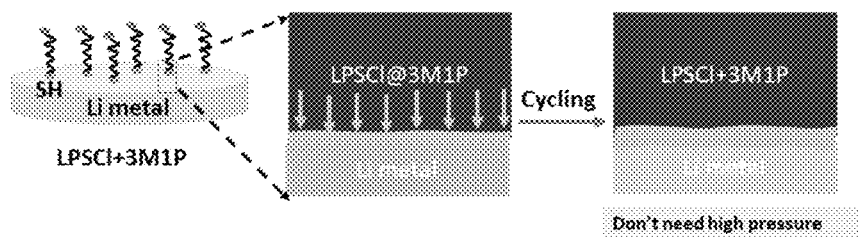
Figure 2A:
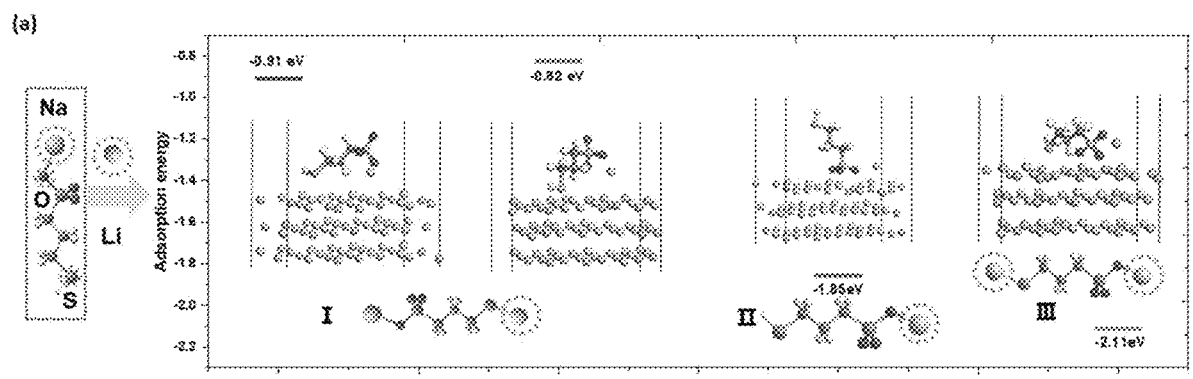
FIGS. 2A-F show details regarding the interface characterization.
Figure 2B:
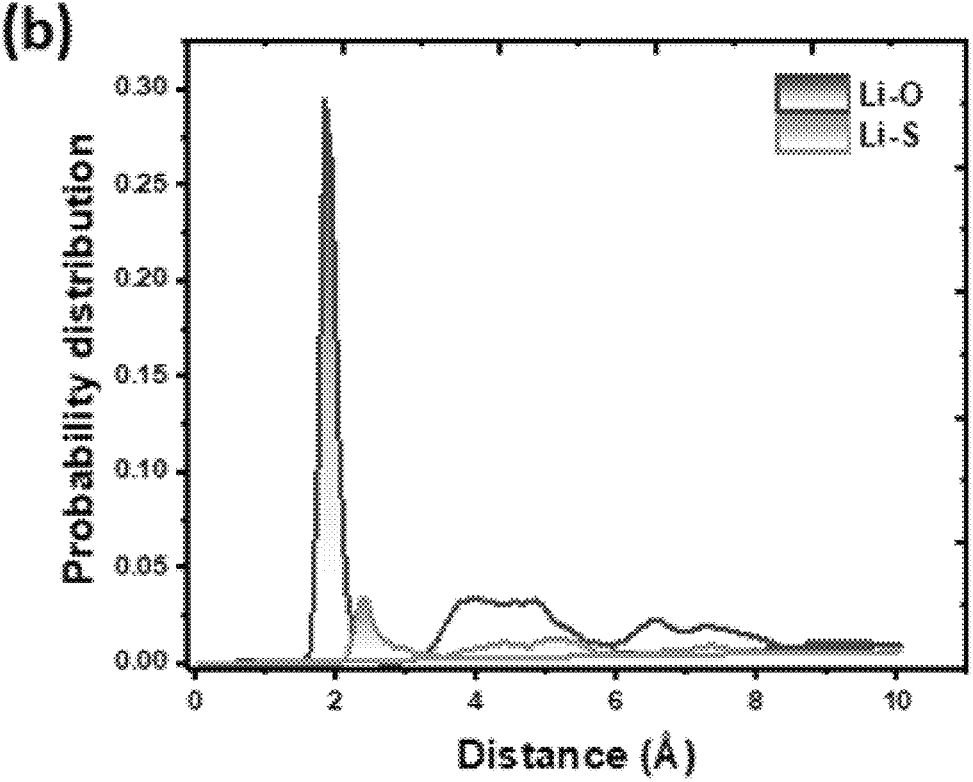
Figure 2C:
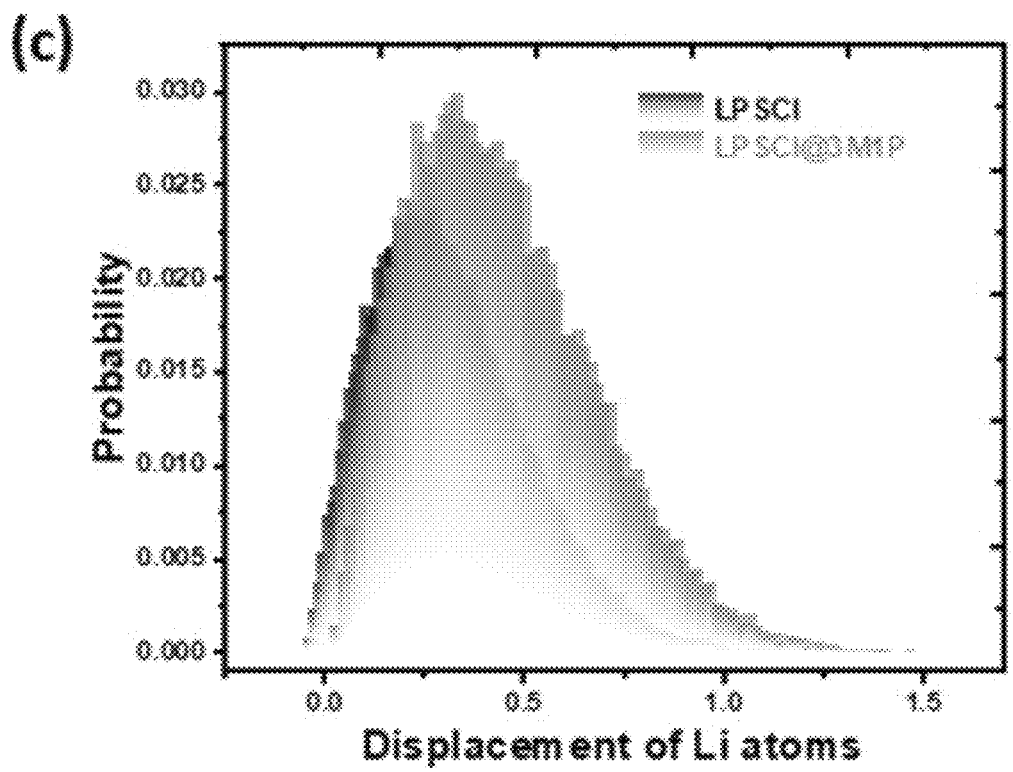
Figure 2D:
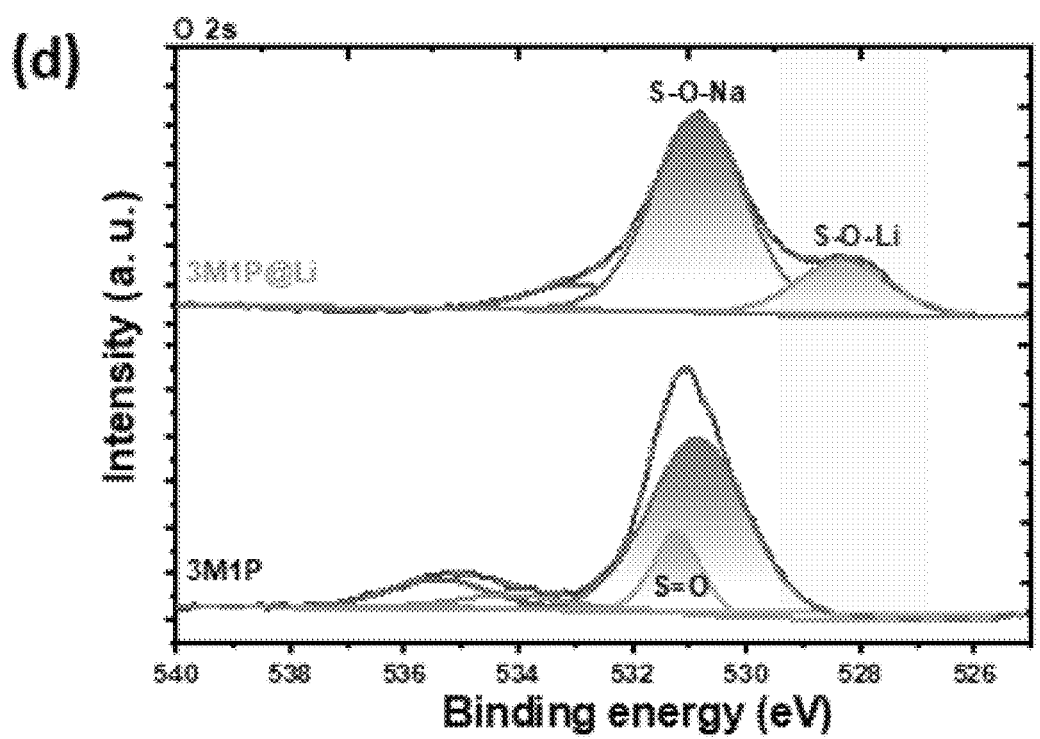
Figure 2E:
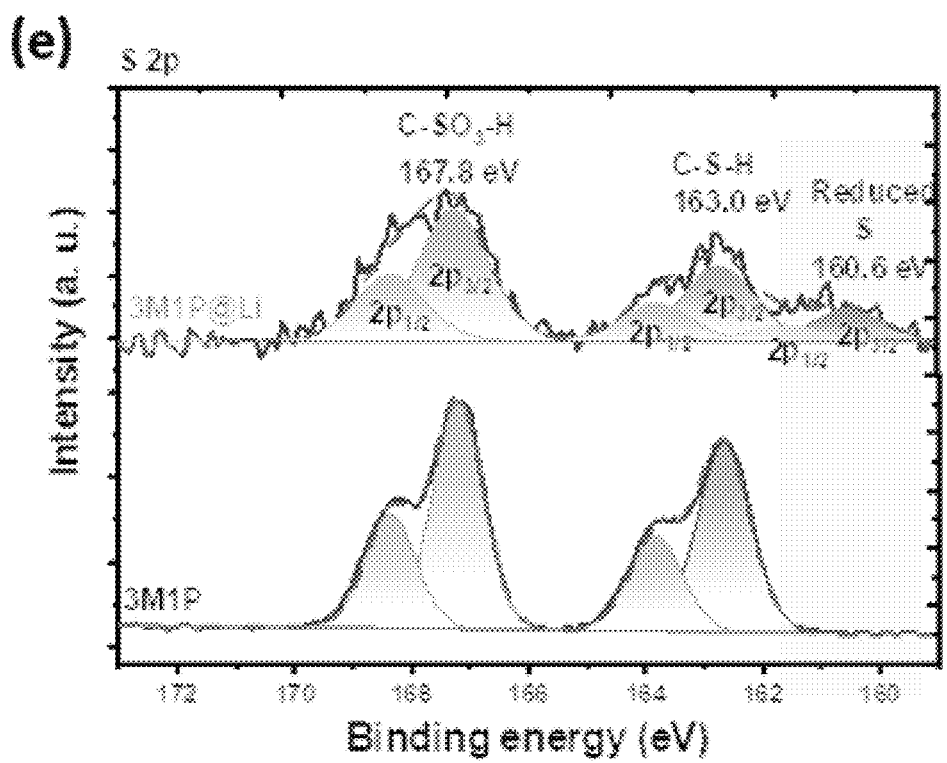
Figure 2F:
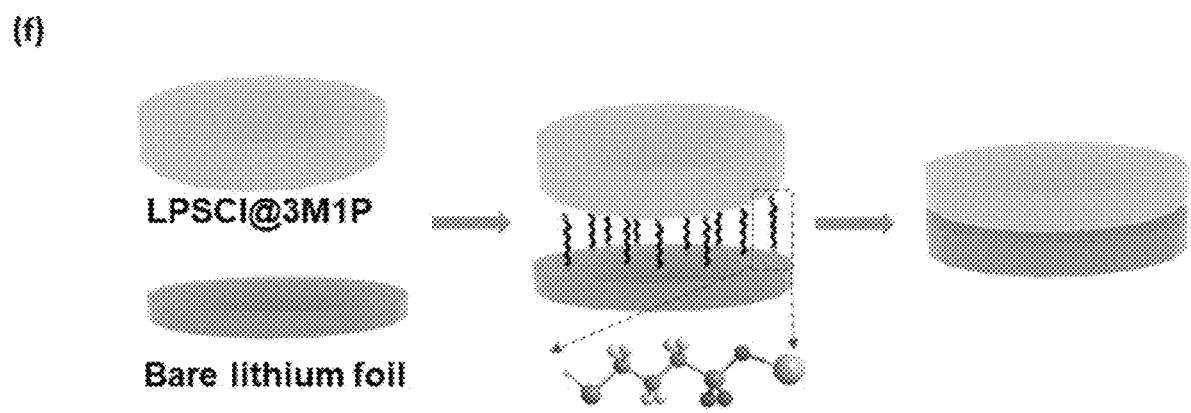

FIG. 1A shows a schematic illustration of lithium deposition for a conventional electrolyte comprising LPSCl. Specifically, argyrodite ($Li_6PS_5X$, where X=I, Cl and Br) is chemically/electrochemically unstable against metallic Li and tends to decompose into LiX (X=Cl, Br, I), $Li_2S$ and $Li_3P$ upon contact with Li metal. Additionally, the cell is prone to failure due to short circuits arising from ubiquitous penetration of lithium dendrites through the SSE during plating. Furthermore, the contact area can be lost due to void formation between the SSE and Li during stripping. In such circumstances, increasing stack pressure is widely used in an all-solid-state battery to ensure contact and minimize the interfacial impedance between the SSE and Li metal. However, this approach can dramatically increase the battery's footprint (e.g., by stacking components like springs) and production cost. Therefore, it is desirable for cells to operate at or below 5 MPa. FIG. 1B shows a schematic illustration of lithium deposition for an electrolyte comprising LPSCl and 3M1P according to one or more aspects of the disclosure. As described herein, by using surface molecular engineering to deposit a compound of 3M1P onto the surface of the $Li_6PS_5Cl$ (LPSCl) electrolyte, e.g., using a ball-milling method, the resulting electrolyte avoids the need for high pressure during operation. That is, a compatible interface of electrolyte with Li metal is created, which inhibited Li dendritic growth and ultimately allowed the battery to function even under low pressure operation (FIG. 1).

EXAMPLES

The following examples are not intended to be limiting. The above disclosure provides many different aspects for implementing the features of the disclosure, and the following examples describe certain aspects. It will be appreciated that other modifications and methods known to one of ordinary skill in the art can also be applied to the following experimental procedures, without departing from the scope of the disclosure.

Experimental Example 1

An all-solid-state cell was prepared using 3M1P as an additive in a $Li_6PS_5Cl$ (LPSCl) solid oxide electrolyte. The 3M1P compound as a powder was deposited onto the surface of the LPSCl electrolyte using a ball-milling method for 30 minutes under room temperature.

Figure 5A:
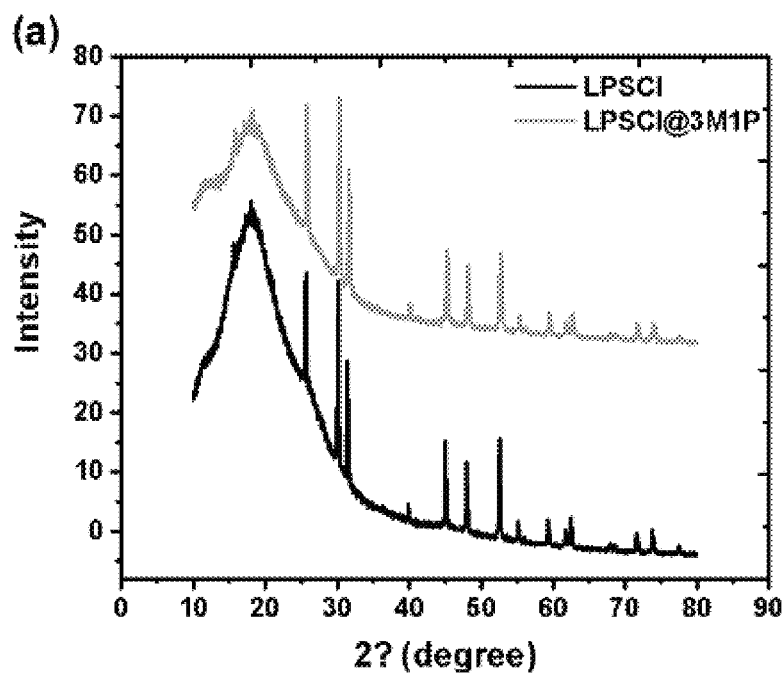
FIG. 5A shows an XRD pattern of an electrolyte comprising LPSCl (lower curve) and an electrolyte comprising LPSCl and 3M1P (upper curve).
Figure 5B:
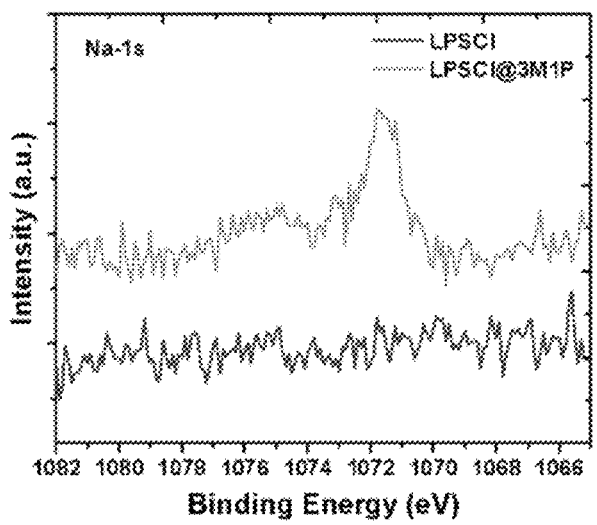
FIG. 5B shows the Na 1s spectra.
Figure 5C:
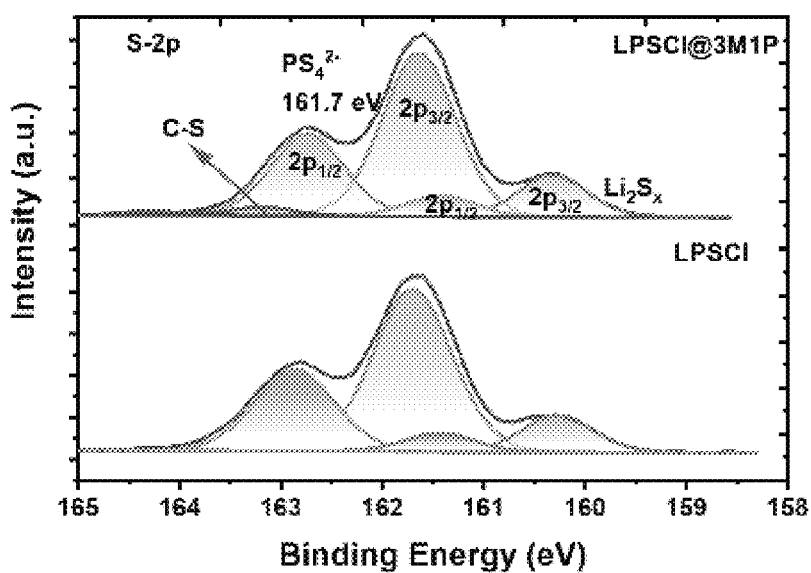
FIG. 5C shows the S 2p spectra, respectively, on the surface of an electrolyte comprising LPSCl (lower curve) and an electrolyte comprising LPSCl and 3M1P (upper curve).

FIG. 5A shows an XRD pattern of an electrolyte comprising LPSCl (lower curve) and an electrolyte comprising LPSCl and 3M1P (upper curve). FIG. 5B shows the Na 1s, and FIG. 5C shows the S 2p spectra on the surface of LPSCl and LPSCl+3M1P for an electrolyte comprising LPSCl and an electrolyte comprising LPSCl and 3M1P. FIG. 5A displays the XRD patterns of LPSCl and LPSCl+3M1P, in which all the major diffraction peaks were well matched with the standard argyrodite structure. Concurrently, we utilized XPS to further investigate the chemical compatibility between 3M1P and LPSCl. A new peak of Na signal is evident in LPSCl+3M1P, as shown in FIG. 5B. The S 2p spectra (FIG. 5C) of LPSCl+3M1P shows a signal corresponding to the bond of C—S, consistent with the structure of 3M1P containing Na and S, indicating the successfully coating. Additionally, a distinct ortho-thiophosphate ($PS_4^{3-}$) signal is present in both electrolytes.

The modified LPSCl powder (e.g., which included a coating formed from the 3M1P additive (sodium 3-mercapto-1-propanesulfonate); referred to as "LPSCl+3M1P") was added into a cell and further pressed into pellet shape with a diameter of 12 mm under 370 MPa. Then Li foils were attached to both sides of the pellet to form the Li∥LPSCl∥Li, and Li∥LPSCl+3M1P∥Li cells. Finally, the sandwich cell was pressed under 30 MPa and low pressure. The assembled symmetric cells were tested with a different current density and time using LAND potentiostat to confirm the critical current density and cycling performance.

Figure 6A:
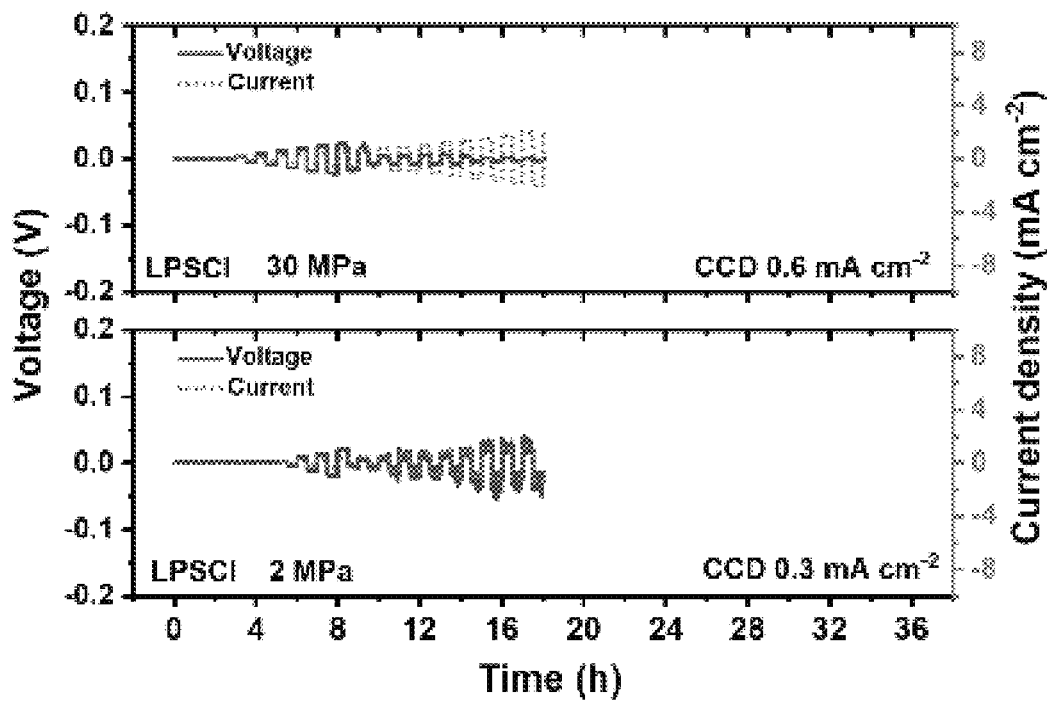
FIG. 6A shows the critical current density (CCD) of a symmetric Li|LPSCl|Li cell and FIG. 6B shows the critical current density (CCD) of a symmetric Li|LPSCl+3M1P|Li, respectively, each at stack pressures of 30 MPa and 2 MPa.
Figure 6B:
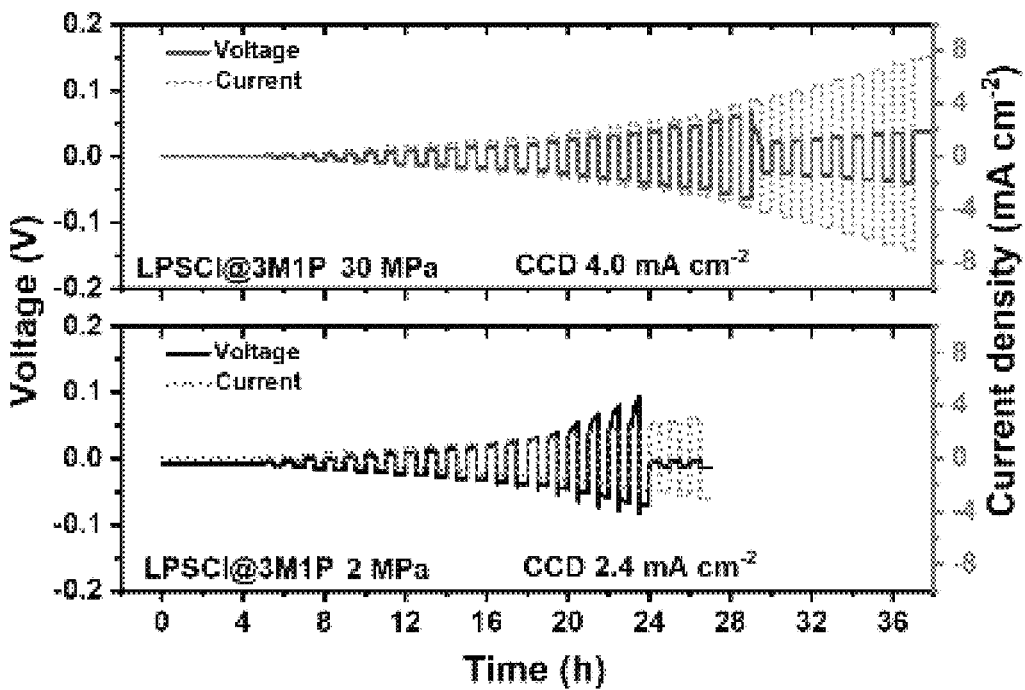

FIG. 6A shows the critical current density (CCD) of a symmetric Li∣LPSCl∣Li cell, and FIG. 6B shows the critical current density (CCD) of a symmetric Li∣LPSCl+3M1P∣Li, respectively, each at stack pressures of 30 MPa and 2 MPa. FIG. 6 illustrates the performance Li∣LPSCl or LPSCl+3M1P∣Li symmetric cells using LPSC and LPSCl+3M1P electrolytes at various stack pressures. We can conclude that the 3M1P organic compound demonstrates an impressive increase in CCD, reaching 4.0 and 2.4 mA cm$^{-2}$ at stack pressures of 30 MPa and 2 MPa, respectively.

Experimental Example 2

To evaluate symmetric and the full cell's electrochemical performances, ASSB with a diameter of 13 mm, composed of polyaryletheretherketone (PEEK) mold and Ti rods were assembled. 240 mg of LPSC or LPSC+3M1P pressed under 375 MPa were used as electrolyte. The cathode composite was made by mixing NCM811 (LG Energy Solution)—LPSC (Ampcera Inc, used as received)—vapor grown carbon fiber (Sigma Aldrich) in the weight ratio of 64:33:3 in a mortar and pestle, with loading of 4 mg/cm$^2$. The cathode and electrolyte layers were pressed to 375 MPa, while the Li as anode was pressed to 30 MPa. All cells were assembled in an argon atmosphere glovebox. Cell measurements were made on a LAND multi-channel battery testing system. The galvanostatic charge-discharge tests of full cells were conducted within the voltage range of 2.5-4.25 V at a rate of 0.1 C under 60° C.

Figure 7A:
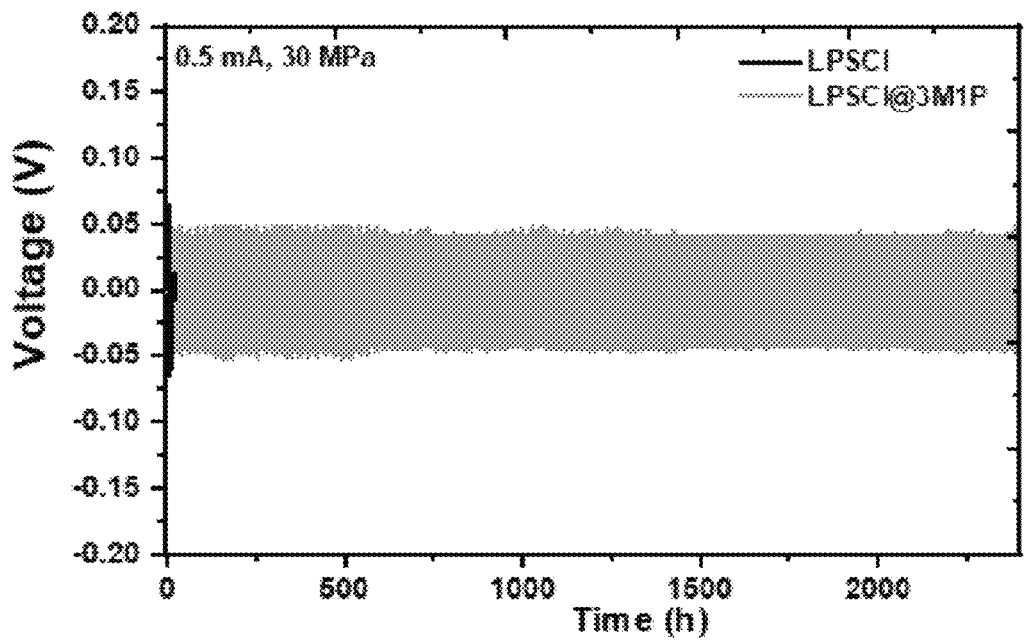
FIG. 7A and FIG. 7C show long term cycling stability of LPSCl and LPSCl+3M1P, respectively, in symmetric cells at various stack pressures and current densities.
Figure 7B:
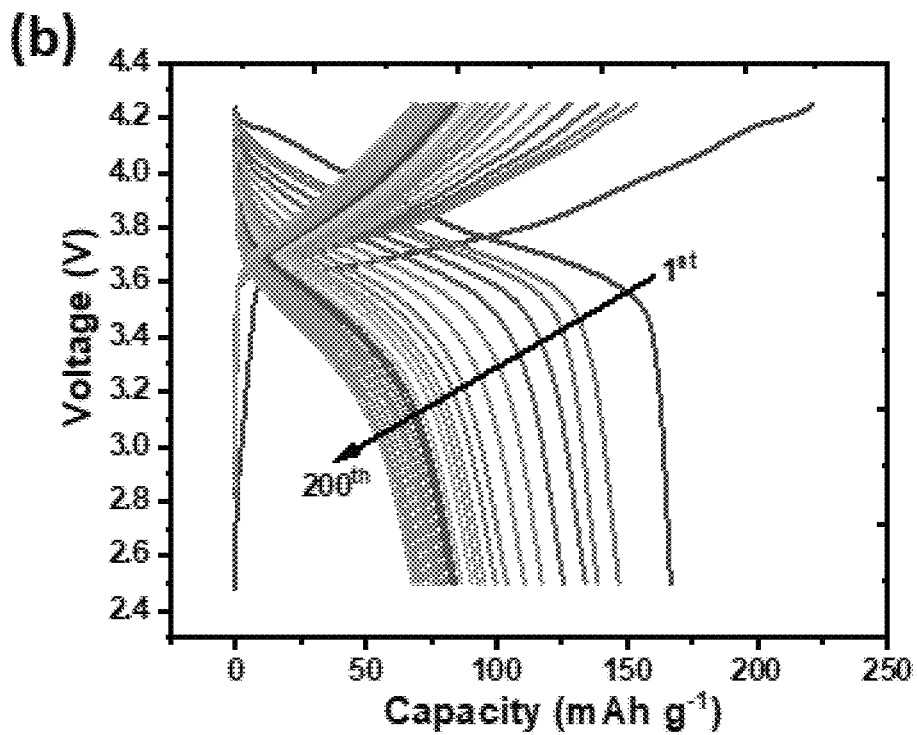
FIG. 7B and FIG. 7D show charge-discharge profiles of NCM811|LPSCl|Li and NCM811|LPSCl+3M1P|Li, respectively.
Figure 7C:
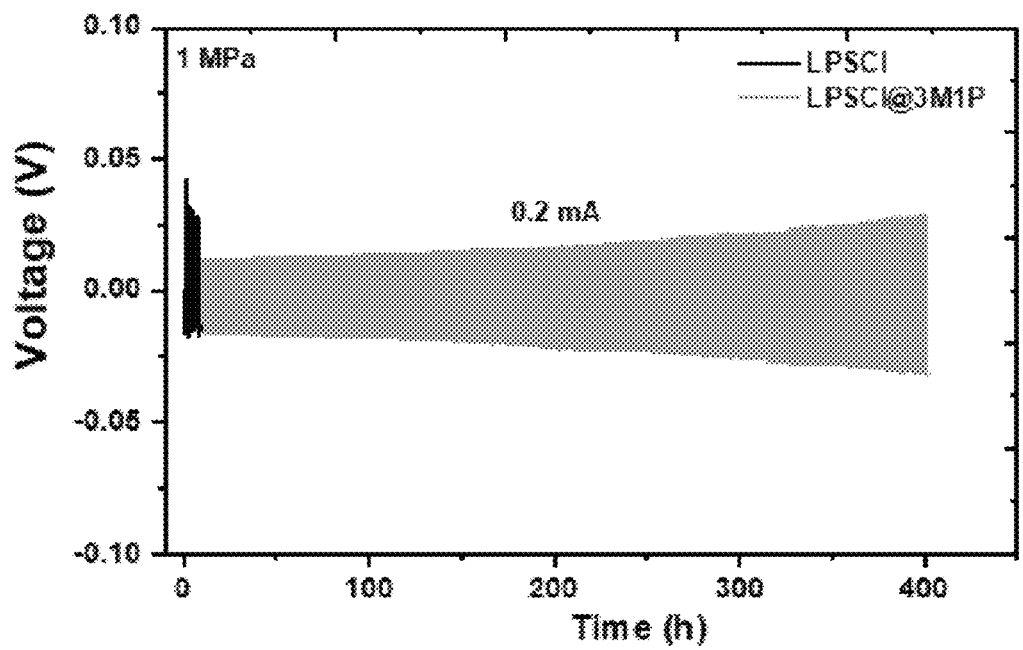
Figure 7D:
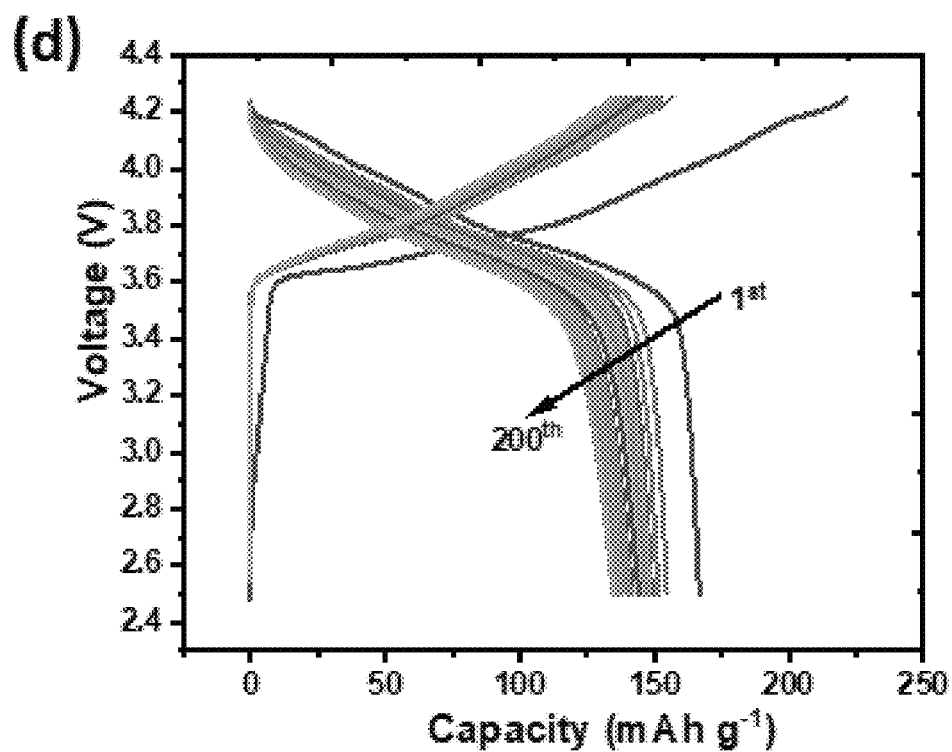

FIG. 7A and FIG. 7C show long term cycling stability of LPSCl and LPSCl+3M1P, respectively, in symmetric cells at various stack pressures and current densities. FIG. 7B and FIG. 7D show charge-discharge profiles of NCM811∣LPSCl∣Li and NCM811∣LPSCl+3M1P∣Li, respectively.

The long-term cycle performance of symmetric cells and full cell at various stack pressures and current densities for both electrolytes is shown in FIG. 4 a, b. LPSCl+3M1P ASSB exhibits excellent long-term cycle stability (FIG. 4c) under stack pressure of 1 MPa in symmetric cells and a much higher capacity retention of 84% after 200 cycles (FIG. 4d) than that of LPSC in full cells.

It will be understood by those of ordinary skill in the art that aspects of the present disclosure can be performed within a wide equivalent range of parameters without affecting the scope of the disclosure described herein. All publications, patent applications and patents disclosed herein are incorporated by reference in their entirety.

What is claimed is:

1. A solid electrolyte composition comprising:
   a sulfide-containing solid electrolyte material, having a surface; and
   an organic coating, wherein the organic coating is formed on the surface of the sulfide-containing solid-state electrolyte material, and
   wherein the coating is formed from at least one compound of Chemical Formula 1 and the sulfide-containing solid-state electrolyte material:

A-R—W    Chemical Formula 1 wherein:
   A is a SH, a triethoxysilyl group or a trimethoxysilyl group;
   R is a substituted or unsubstituted C3-C20 alkylene group; and
   W is a sulfonate, a phosphonate, or a salt thereof.

2. The solid electrolyte composition according to claim 1, wherein the compound of Chemical Formula 1 is attached to the surface of the sulfide-containing solid-state electrolyte material by chemisorption, van der Waals interaction, or ionic interaction.

3. The solid electrolyte composition according to claim 1, wherein the compound of Chemical Formula 1 reacts with the sulfide-containing solid-state electrolyte material to form a covalent bond.

4. The solid electrolyte composition according to claim 1, wherein in the compound of Chemical Formula 1, A is the SH group.

5. The solid electrolyte composition according to claim 1, wherein in the compound of Chemical Formula 1, A is a triethoxysilyl or a trimethoxysilyl.

6. The solid electrolyte composition according to claim 1, wherein in the compound of Chemical Formula 1, R is a C6-C16 alkylene group.

7. The solid electrolyte composition according to claim 1, wherein in the compound of Chemical Formula 1, R is a C8-C12 alkylene group.

8. The solid electrolyte composition according to claim 1, wherein the compound of Chemical Formula 1 has a total of 6 to 16 carbons.

9. The solid electrolyte composition according to claim 1, wherein the compound of Chemical Formula 1 has a total of 8 to 12 carbons.

10. The solid electrolyte composition according to claim 1, wherein in the compound of Chemical Formula 1, at least one of R is a substituted C3-C20 alkylene group, wherein there are one or more substituents selected from fluorine, chlorine, bromine, ester or ketone moieties.

11. The solid electrolyte composition according to claim 1, wherein the compound of Chemical Formula 1 is sodium 3-mercapto-1-propanesulfonate (3M1P).

12. The solid electrolyte composition according to claim 1, wherein the sulfide-containing solid electrolyte material is selected from the group consisting of an inorganic-based electrolyte material and an organic-based electrolyte material.

13. The solid electrolyte composition according to claim 1, wherein the sulfide-containing solid electrolyte material is an inorganic electrolyte.

14. The solid electrolyte composition according to claim 1, wherein the sulfide-containing solid electrolyte comprises at least one selected from $Li_3P_7S_{11}$, $Li_{10}GeP_2S_{12}$, and $Na_3PS_4$ and/or $Li_6PS_5Cl$.

15. The solid electrolyte composition according to claim 1, wherein the sulfide-containing solid electrolyte comprises at least one selected from LPS-based glass or glass ceramic of formula $xLi_2S \cdot yP_2S_5$, wherein x+y=1.

16. The solid electrolyte composition according to claim 1, wherein the sulfide-containing solid electrolyte comprises an argyrodite-based solid electrolyte of formula $Li_6PS_5X$, wherein X is Cl, Br, or I.

17. The solid electrolyte composition according to claim 1, wherein the sulfide-containing solid electrolyte comprises an argyrodite-based solid electrolyte of formula $Li_{6-y}PS_{5-y}Cl_{1+y}$, where y is <1.

18. A method for making the solid electrolyte composition according to claim 1, comprising:
    providing a sulfide-containing solid electrolyte material; and
    reacting the solid electrolyte material with at least one compound of Chemical Formula 1 to form a coated sulfide-containing solid electrolyte material:

A-R—W    Chemical Formula 1 wherein:
    A is a SH, a triethoxysilyl group or a trimethoxysilyl group;
    R is a substituted or unsubstituted C3-C20 alkylene group; and
    W is a sulfonate, a phosphonate, or a salt thereof.

19. A method for making a solid electrolyte, comprising:
    providing a sulfide-containing solid electrolyte material;
    reacting the solid electrolyte material with at least one compound of Chemical Formula 1 to form a coated sulfide-containing solid electrolyte material; and
    using the coated sulfide-containing solid electrolyte material to form a solid electrolyte:

A-R—W    Chemical Formula 1 wherein:
    A is a SH, a triethoxysilyl group or a trimethoxysilyl group;
    R is a substituted or unsubstituted C3-C20 alkylene group; and
    W is a sulfonate, a phosphonate, or a salt thereof.

20. An all-solid-state battery comprising:
    a negative electrode,
    a positive electrode; and
    a solid electrolyte comprising the solid electrolyte composition according to claim 1, wherein the solid electrolyte is interposed between the negative electrode and the positive electrode.

* * * * *

UNITED STATES PATENT AND TRADEMARK OFFICE
CERTIFICATE OF CORRECTION

PATENT NO. : 12,148,880 B1
APPLICATION NO. : 18/650734
DATED : November 19, 2024
INVENTOR(S) : Ping Liu et al.

Page 1 of 1

It is certified that error appears in the above-identified patent and that said Letters Patent is hereby corrected as shown below:

In the Specification

<u>At Column 8, Lines 4-6:</u>
Change: "The Li 1s spectrum (FIG. 1D) confirmed the new bonding in Li@3M1P assignment with the responsive oxide Li peaks at 54.33 eV. Meanwhile, the O 2s (FIG. 1F) can be observed"
To: --The Li 1s spectrum confirmed the new bonding in Li@3M1P assignment with the responsive oxide Li peaks at 54.33 eV. Meanwhile, the O 2s can be observed--.

Signed and Sealed this
Seventeenth Day of June, 2025

Coke Morgan Stewart
*Acting Director of the United States Patent and Trademark Office*